(12) United States Patent
Rhodes et al.

(10) Patent No.: US 11,050,085 B2
(45) Date of Patent: Jun. 29, 2021

(54) ELECTROLYTE FOR ELECTROCHEMICAL ENERGY STORAGE DEVICES

(71) Applicant: Lynntech, Inc., College Station, TX (US)

(72) Inventors: Christopher P. Rhodes, College Station, TX (US); Matthew E. Mullings, College Station, TX (US)

(73) Assignee: Lynntech, Inc., College Station, TX (US)

( * ) Notice: Subject to any disclaimer, the term of this patent is extended or adjusted under 35 U.S.C. 154(b) by 175 days.

(21) Appl. No.: 16/182,067

(22) Filed: Nov. 6, 2018

(65) Prior Publication Data

US 2019/0074547 A1 Mar. 7, 2019

Related U.S. Application Data

(63) Continuation of application No. 14/708,079, filed on May 8, 2015, now Pat. No. 10,164,291.

(Continued)

(51) Int. Cl.
*H01M 10/0567* (2010.01)
*H01M 10/0569* (2010.01)
(Continued)

(52) U.S. Cl.
CPC ........ *H01M 10/0567* (2013.01); *H01G 11/60* (2013.01); *H01G 11/62* (2013.01);
(Continued)

(58) Field of Classification Search
CPC ......... H01M 10/0567; H01M 10/0569; H01M 10/0568; H01M 2300/004;
(Continued)

(56) References Cited

U.S. PATENT DOCUMENTS 8,920,981 B2   12/2014   Smart et al.
9,293,773 B2    3/2016   Smart et al.
(Continued)

OTHER PUBLICATIONS

Arbizzani, C., et al., "Safe, high-energy supercapacitors based on solvent-free ionic liquid electrolytes," Journal of Power Sources, 185, Sep. 19, 2008, pp. 1575-1579.

(Continued)

*Primary Examiner* — Gary D Harris
(74) *Attorney, Agent, or Firm* — Edwin S. Flores; Chalker Flores, LLP

(57) ABSTRACT

An electrolyte for an electrochemical storage device is disclosed. In one embodiment, the electrolyte includes a lithium salt from about 3% to about 20% by weight, a primary solvent from about 15% to about 25% by weight, wide-temperature co-solvents from about 14% to about 55% by weight, interface forming compounds from about 0.5% to about 2.0% by weight, and a flame retardant compound from about 6% to about 60% by weight. The electrolyte interacts with the positive and negative electrodes of the electrochemical storage device to provide both high performance and improved safety such that the electrolyte offers adequate ionic conductivity over the desired operating temperature range, a wide electrochemical stability window, high capacities for both the cathode and anode, low electrode-electrolyte interfacial resistance, and reduced flammability.

14 Claims, 15 Drawing Sheets

Related U.S. Application Data

(60) Provisional application No. 61/990,308, filed on May 8, 2014.

(51) Int. Cl.

|  |  |
|---|---|
| *H01G 11/60* | (2013.01) |
| *H01G 11/62* | (2013.01) |
| *H01G 11/64* | (2013.01) |
| H01M 10/0525 | (2010.01) |
| H01M 10/0568 | (2010.01) |

(52) U.S. Cl.
CPC ........ *H01G 11/64* (2013.01); *H01M 10/0569* (2013.01); *H01M 10/0525* (2013.01); *H01M 10/0568* (2013.01); *H01M 2300/004* (2013.01); *H01M 2300/0037* (2013.01); *Y02E 60/13* (2013.01); *Y02T 10/70* (2013.01)

(58) Field of Classification Search
CPC ...... H01M 10/0525; H01M 2300/0037; H01G 11/60; H01G 11/62; H01G 11/64; Y02E 60/13; Y02T 10/7022
USPC ........................................................ 429/331
See application file for complete search history.

(56) References Cited

U.S. PATENT DOCUMENTS

| | | | |
|---|---|---|---|
| 2003/0157413 | A1 | 8/2003 | Chen et al. |
| 2008/0305401 | A1 | 12/2008 | Smart et al. |
| 2012/0094190 | A1* | 4/2012 | Mimura ............... H01M 10/052 429/324 |

OTHER PUBLICATIONS

Carlberg, J.C., et al., "Poly(3,4-ethylenedioxythiophene) as Electrode Material in Electrochemical Capacitors," J. Electrochem. Soc., vol. 144, No. 4, Apr. 1997, pp. L61-L64.

Du Pasquier, A., et al., "Li4Ti5O12/poly(methyl)thiophene asymmetric hybrid electrochemical device," Journal of Power Sources, 125, Jul. 23, 2003, pp. 95-102.

Ferraris, J.P., et al., "Performance evaluation of Poly 3-(Phenylthiophene) Derivatives as Active Materials for Electrochemical Capacitor Applications," Chem Mater, vol. 10, Jul. 16, 1998, pp. 3528-3535.

Galinski, M., et al., "Ionic Liquids as Electrolytes," Electrochimica Acta, vol. 51, Apr. 19, 2006, pp. 5567-5580.

Hagiwara, R., et al., "Ionic Liquids for Electrochemical Devices," Electrochemistry, vol. 75:1, Oct. 25, 2006, pp. 23-34.

Li, W., et al., "Application of ultrasonic irradiation in preparing conducting polymer as active materials for supercapacitor," Materials Letters, vol. 59, Dec. 7, 2004, pp. 800-803.

Liu, R., et al., "MnO2/Poly(3,4-ethylenedioxythiophene) Coaxial Nanowires by One-Step Coelectrodeposition for Electrochemical Energy Storage," J. Am. Chem. Soc., vol. 130, Dec. 19, 2007, pp. 2942-2943.

Liu, R., et al., "Poly(3,4-ethylenedioxythiophene) nanotubes as electrode materials for high-powered supercapacitor," Nanotechnology, vol. 19, Apr. 23, 2008, 8 pp.

Ma, L., et al., "Using room temperature ionic liquid to fabricate PEDOT/TiO2 nanocomposite electrode-based electrochromic devices with enhanced long-term stability," Solar Energy Materials & Solar Cells, vol. 92, Apr. 27, 2008, pp. 1253-1259.

Machida, K., et al., "High-Voltage Asymmetric Electrochemical Capacitor Based on Polyfluorene Nanocomposite and Activated Carbon," Journal of the Electrochemical Society, vol. 155:12, Oct. 16, 2008, pp. A970-A974.

Nagatomo, T., et al., "Poly(3-methylthiophene) A Stable Cathode-Active Material for Secondary Batteries," J. Electrochem. Soc., vol. 135, No. 9, Sep. 1998, pp. 2124-2128.

Soundan, P., et al., "Synthesis, chemical polymerization and electrochemical properties of low band gap conducting polymers for use in supercapacitors," Journal of Materials Chemistry, vol. 11, Feb. 6, 2001, pp. 773-782.

Stenger-Smith, J., et al., "Poly(3,4-alkylenedioxythiophene)-Based Supercapacitors Using Ionic Liquids as Supporting Electrolytes," vol. 149 (8), Jun. 17, 2002, pp. A973-A977.

US Dept. of Energy, "Progress Report for Energy Storage Research and Development," FY 2008, Jan. 2009, 184 pp.

US Dept. of Defense, "Power Sources Technology Road Map," Oct. 1, 2009, 200 pp.

\* cited by examiner

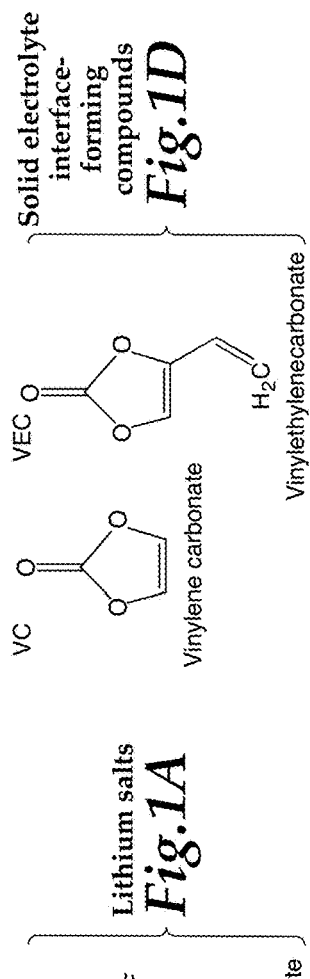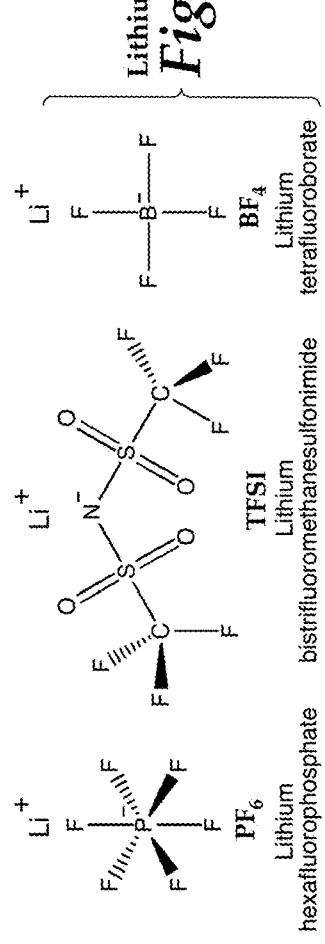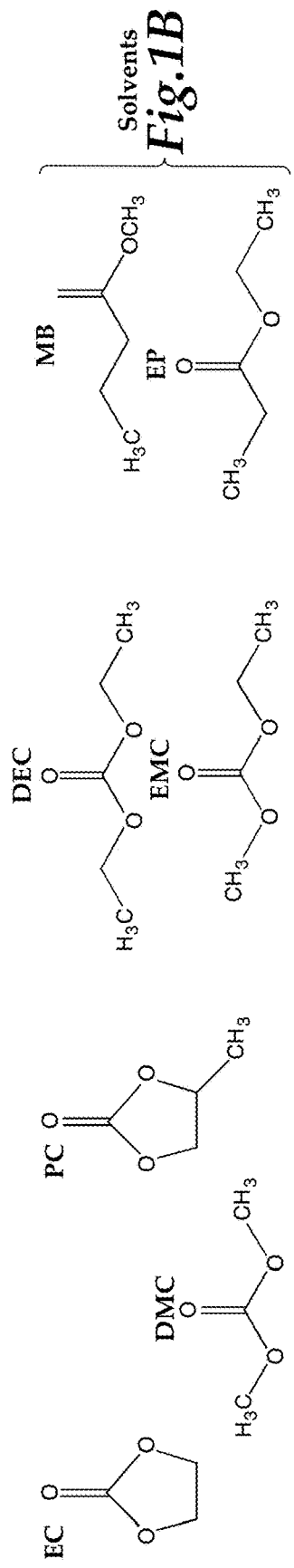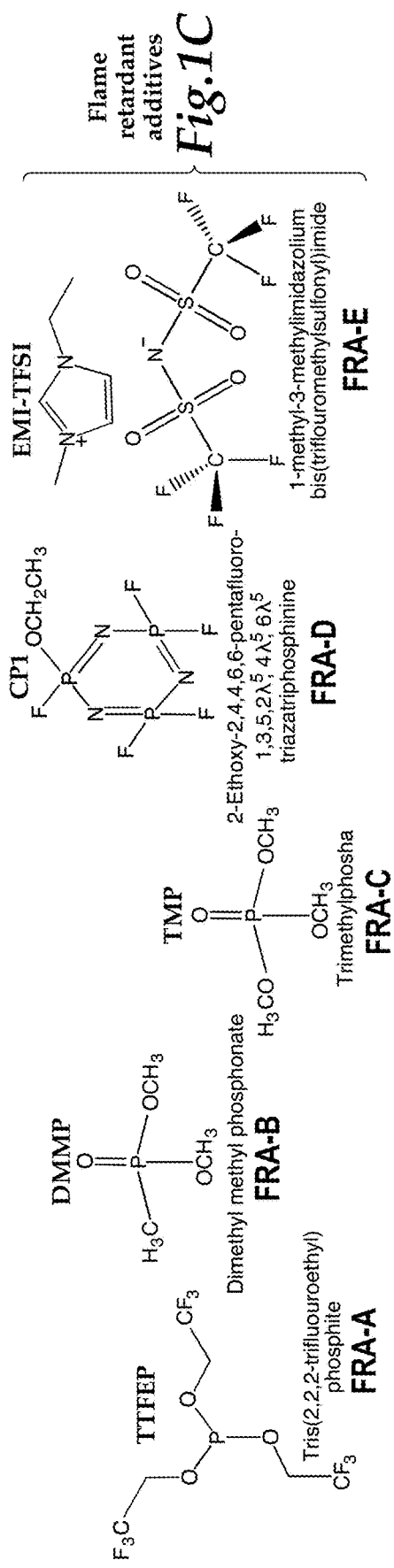
Fig.1A Lithium salts
Fig.1B Solvents
Fig.1C Flame retardant additives
Fig.1D Solid electrolyte interface-forming compounds

ELECTROLYTE FOR ELECTROCHEMICAL ENERGY STORAGE DEVICES

PRIORITY STATEMENT & CROSS-REFERENCE TO RELATED APPLICATIONS

This application is a continuation application of U.S. patent application Ser. No. 14/708,079 filed on May 8, 2015, entitled "Electrolyte for Electrochemical Energy Storage Devices," which claims priority to U.S. Patent Application No. 61/990,308, entitled "Electrolytes with Reduced Flammability and Wide Operating Temperature Ranges" and filed on May 8, 2014, in the names of Christopher P. Rhodes and Matthew E. Mullings; which is hereby incorporated by reference for all purposes.

STATEMENT REGARDING FEDERALLY SPONSORED RESEARCH AND DEVELOPMENT

This invention was made with government support under contracts N68936-09-C-0059, N68335-10-C-0347, and N68335-11-C-0425 awarded by the Department of the Defense (Navy). The government has certain rights in this invention.

TECHNICAL FIELD OF THE INVENTION

This invention relates, in general, to electrolytes that provide for ion movement and, in particular, to electrolytes that provide for ion movement in electrochemical energy storage devices, such as batteries, supercapacitors, and similar devices.

BACKGROUND OF THE INVENTION

Without limiting the scope of the present invention, the background will be described in relation to rechargeable lithium-ion batteries, as an example. Rechargeable lithium-ion batteries have improved safety and high performance characteristics such as high capacities, high rates, long cycle lives, and wide temperature ranges. These characteristics are needed for a variety of applications such as electric vehicles, aircraft, and consumer electronics, for example. The electrolytes used for current Li-ion batteries, however, are highly flammable and this play a key role in battery safety. Too often, flammability is reduced at the expense of performance by the use of non-flammable compounds that negatively impact performance. The development of a non-flammable electrolyte that does not reduce battery performance is needed.

SUMMARY OF THE INVENTION

It would be advantageous to improve flammability profiles in electrolytes that provide for ion movement in electrochemical energy storage devices, such as batteries, supercapacitors, and similar devices. It would also be advantageous to provide the aforementioned significant improvements to the safety of the electrochemical energy storage devices while maintaining high performance. It would also be desirable to enable a chemical-based solution that provides both high performance and improved safety such that the electrolyte offers adequate ionic conductivity over the desired operating temperature range, a wide electrochemical stability window, high capacities for both the cathode and anode, low electrode-electrolyte interfacial resistance, and reduced flammability. The electrolyte composition is a compromise between these various factors and the specific composition of the electrolyte will depend on the application and its requirements, such as desired temperature range, electrode materials, and rate, for example.

To better address one or more of these concerns, an electrolyte that provides for ion movement in electrochemical energy storage devices is disclosed. In one embodiment, the electrolyte includes a lithium salt from about 3% to about 20% by weight, a primary solvent from about 15% to about 25% by weight, wide-temperature co-solvents from about 14% to about 55% by weight, interface forming compounds from about 0.5% to about 2.0% by weight, and a flame retardant compound from about 6% to about 60% by weight. The electrolyte interacts with the positive and negative electrodes of the electrochemical storage device to provide both high performance and improved safety such that the electrolyte offers adequate ionic conductivity over the desired operating temperature range, a wide electrochemical stability window, high capacities for both the cathode and anode, low electrode-electrolyte interfacial resistance, and reduced flammability. These and other aspects of the invention will be apparent from and elucidated with reference to the embodiments described hereinafter.

BRIEF DESCRIPTION OF THE DRAWINGS

The patent or application file contains at least one drawing executed in color. Copies of this patent or patent application publication with color drawings will be provided by the Office upon request and payment of the necessary fee.

For a more complete understanding of the features and advantages of the present invention, reference is now made to the detailed description of the invention along with the accompanying figures in which corresponding numerals in the different figures refer to corresponding parts and in which:

FIG. 1A is a portion of a chemical glossary that describes structures of selected electrolyte components grouped as classes of compounds and specifically lithium salts in FIG. 1A;

FIG. 1B is a portion of a chemical glossary that describes structures of selected electrolyte components grouped as classes of compounds and specifically solvents in FIG. 1B;

FIG. 1C is a portion of a chemical glossary that describes structures of selected electrolyte components grouped as classes of compounds and specifically flame retardant additives in FIG. 1C;

FIG. 1D is a portion of a chemical glossary that describes structures of selected electrolyte components grouped as classes of compounds and specifically solid electrolyte interface-forming compounds in FIG. 1D;

DETAILED DESCRIPTION OF THE INVENTION

Figure 2:
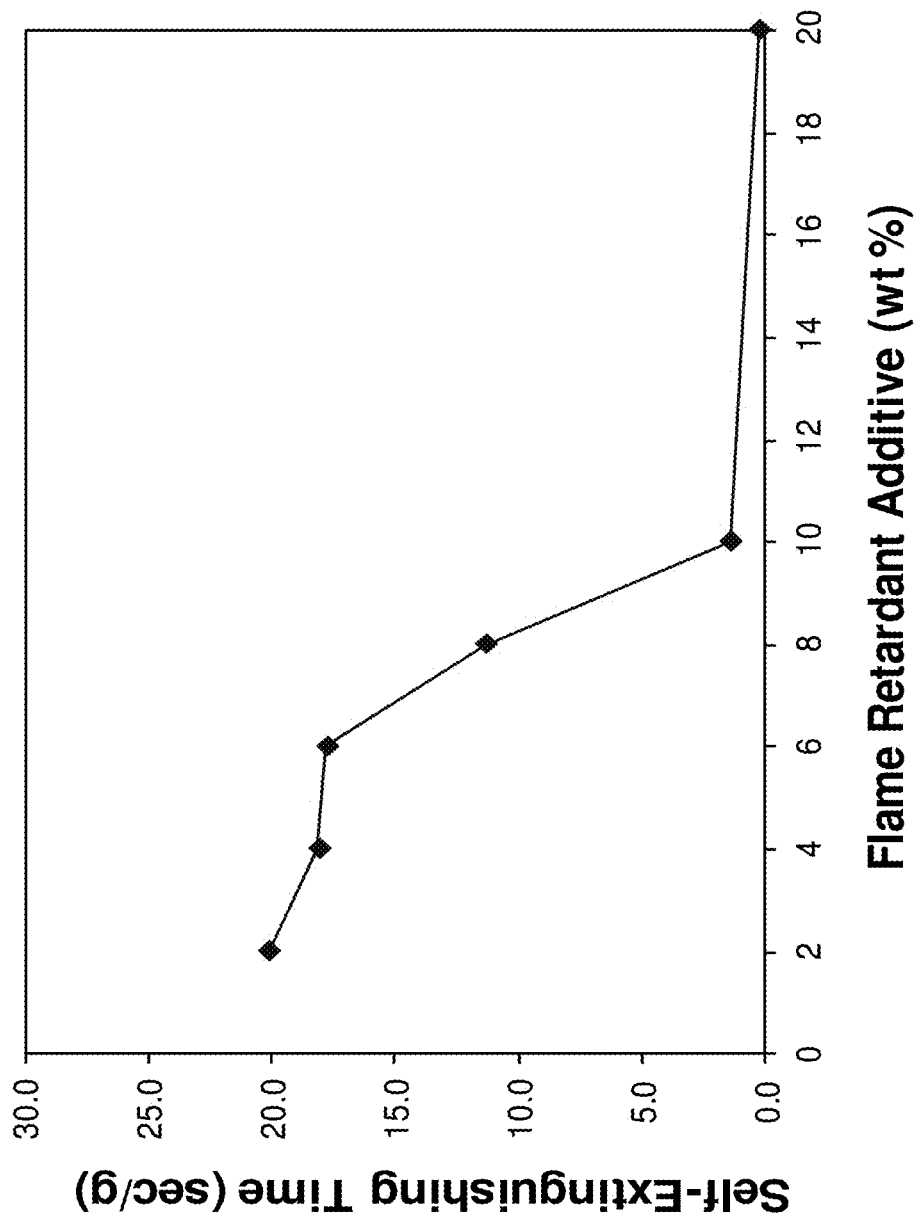
FIG. 2 is a graph of mass normalized self-extinguishing time versus mass amount (wt %) of flame retardant additive FRA-D within the electrolyte mixture.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1A through FIG. 1D, therein is depicted, collectively, a chemical glossary relative to an electrolyte for an electrochemical storage device presented herein. The electrolyte interacts with at least one positive electrode configured to store and release lithium-ions and at least one negative electrode configured to store and release lithium-ions. The at least one positive electrode and the at least one negative electrode form portions of the electrochemical storage device, which may be a battery, lithium-ion battery, or supercapacitor for example.

The electrolyte is based on specific combinations of compounds that result in an electrolyte with reduced flammability and wide temperature range operation. By using appropriately designed mixtures of specific compounds with specific amounts of the components, electrolytes with both improved safety and high performance may be obtained. This unique combination of electrolyte properties may be obtained with specific components that when combined in specific amounts impart the desired electrolyte properties. The desired combination of electrolyte properties is not obtained with prior electrolyte compositions that show either reduced flammability or wide temperature operation, but not both reduced flammability and wide temperature operation.

Non-aqueous liquid electrolytes are typically composed of a salt, one or more solvents, and other additives. In order to obtain an electrolyte with the desired properties, specific types of salts, solvents, and additives are required to be combined in specific amounts.

For a lithium-ion conducting electrolyte, lithium salts such as lithium hexafluorophosphate (LiPF$_6$), lithium perchlorate (LiClO$_4$), lithium bistrifluoromethanesulfonimide (LiTFSI), lithium tetrafluoroborate (LiBF$_4$), or other salts are suitable. The electrolyte's salt affects the ionic conductivity based on the ion-ion and ion-solvent interactions of the salt and solvents. The concentration of the salt is important to optimize the ionic conductivity. Generally high concentrations of ions increase the ionic conductivity up to a point, after which the conductivity decreases. Additionally, the solubility of the salt and the solvents is important. Electrolytes can be made for with a variety of salts or mixtures of salts. Lithium salt concentrations of about 0.8 to about 1.2 M LiPF$_6$ were used to obtain an electrolyte with high ionic conductivity, but the use of other salts is not precluded.

The type and amount of solvents and co-solvents is critically important to the electrolyte properties. Ethylene carbonate (EC) provides primary coordination of Li-ions in the first (primary) solvation sphere. However, Ethylene carbonate (EC) is a solid at room temperature (freezing point of +38° C.), and therefore by itself is not an adequate solvent for an electrolyte that functions as liquid at room temperature. Generally, one or more solvents are used in addition to ethylene carbonate for typical lithium-ion battery electrolytes. The solvents typically combined with ethylene carbonate include dimethyl carbonate (DMC), diethyl carbonate (DEC), and ethyl methyl carbonate (EMC). The type and amount of the solvents can affect a number of important properties including the temperature range (both freezing/melting point and boiling point) and interfacial properties. The melting points and boiling points of electrolyte solvents are presented in Table 1. Ethyl methyl carbonate has a lower freezing point (−55° C.) compared with DEC (−43° C.) or DMC (3° C.). Therefore for improved low temperature range operation, EMC is a preferred solvent based on its solubility with EC and its wide temperature range (freezing point of −55° C. and boiling point of +108° C.). Although propylene carbonate (PC) has a wide temperature range (melting point of −55° C.; boiling point of +240° C.), the use of PC is problematic since it does not allow reversible intercalation of Li-ions within graphitic carbons. By combining EMC with EC at appropriate ratios, an electrolyte with good low temperature performance and good ionic conductivity can be obtained. Too high a concentration of EC will reduce the low temperature performance since the melting point of EC is above room temperature. In one embodiment, a desirable mass ratio of the EC in the electrolyte solution is in the range of 10-25 wt % and a desirable mass ratio of the EMC in the electrolyte solution is 15-55 wt %, depending on the composition of the additional electrolyte components.

TABLE 1

Melting points and freezing points of electrolyte solvents.

| Compound | Melting point, $T_{mp}$ ° C. | Boiling point, $T_{bp}$ ° C. |
| --- | --- | --- |
| Acetonitrile | −46 | 82 |
| Propylene carbonate | −55 | 240 |
| Methyl acetate | −98 | 57 |
| 1,3-Dioxolane | −95 | 78 |
| Dibutyl ether | −98 | 143 |
| Triethylamine | −115 | 89 |
| 1-Methylpyrrolidine | −90 | 78 |
| 1,2-Dimethoxyethane | −58 | 85 |
| Ethylene carbonate | 38 | 243 |
| Dimethyl carbonate | 3 | 91 |
| Diethyl carbonate | −43 | 125 |
| Ethyl methyl carbonate | −55 | 108 |
| Ethyl acetate | −84 | 77 |
| Ethyl propionate | −73 | 99 |
| Ethyl butyrate | −93 | 120 |
| Dimethyl methylphosphonate | −50 | 181 |

Flame retardant compounds can be added to the electrolyte to reduce the flammability. The type and amount of the electrolyte is critically important in order to obtain the desired properties. The flame retardant compound must be soluble in the electrolyte. Additionally, the flame retardant compound should not significantly reduce the ionic conductivity in order to attain high performance. Another important factor is the electrochemical stability of the flame retardant compound. The flame retardant compound can negatively affect performance if it is reduced or oxidized at anodic or cathodic electrode respectively. It is desirable to have a flame retardant compound that has a reduction potential higher than that of other solvents in the mixture such as ethylene carbonate. If the flame retardant compound has a reduction potential higher than other solvents in the mixture, the interfacial layer between the anode and the electrolyte will be predominately formed by the other solvents rather than the flame retardant compound. Since other solvents such as ethylene carbonate form conductive and protective solid-electrolyte interface layers, this is a desirable outcome.

Specifically the use of cyclic polyphosphazene derivatives which include either fluorinated groups, methoxy groups, ethoxy groups, ethers, linear aliphatics, and chlorinated derivatives are desirable as flame retardant compounds. These must be combined in appropriate amounts within the electrolyte in order to impart reduced flammability while maintaining desirable properties including ionic conductivity and wide operating temperature. Using a concentration of between 10-50% of 2-ethoxy-2,4,4,6,6-pentafluoro-1,3,5,2$\lambda^5$, 4$\lambda^5$, 6$\lambda^5$ triazatriphosphinine, a cyclic polyphosphaze derivative, imparts reduced flammability while maintaining reasonable electrolyte properties. Substantially higher concentrations of this compound were not miscible in an electrolyte mixture composed of LiPF$_6$, EC, EMC, and methyl butyrate (MB).

Obtaining good operation at low temperatures (e.g., −20° C. and below) for the electrolyte requires adding specific compounds at specific amounts. The addition of compounds which are soluble in the electrolyte mixtures and which have lower freezing points than EMC provides a method to lower the operating temperature of the electrolyte. The use of compounds such as methyl butyrate, ethyl propionate, ethyl butyrate, 1,3-dioxolane, and ethyl acetate in the electrolyte at concentration ranges of about 10% to about 50% provides improved low temperature operation.

The proper type and amount of the salt, primary solvents, solvents for low temperature operation, and flame retardant additives does not in itself provide a sufficient combination of properties to also enable high temperature stability without the addition of a specific amount of a solid electrolyte interface forming compound. Ethylene carbonate (EC) readily undergoes reductive decomposition on the surface of the anodic (negative) electrode, and it forms a solid electrolyte interface (SEI) layer. Additives such as vinylene carbonate (VC), vinylethylene carbonate (VEC), and phenylethylene carbonate (PhEC) have a higher reduction potential compared to EC. These additives will be preferentially reduced at the anode and therefore the interface layer will be formed predominantly from these compounds. These additives can improve the high temperature stability of the cells, since high temperature electrolyte decomposition is controlled by a stable SEI layer.

Specific types and amounts of the additives are needed in order to balance the low temperature and high temperature performance. Too much of these additives will result in a highly resistive layer that will reduce the low temperature performance since the concentration of the interface forming compound affects the interfacial charge transfer resistance. At low temperatures, cell resistance will increase since the resistance of the electrolyte and the interface increase at low temperatures based on the temperature dependence of ion conduction. An adequate amount of an interface forming compound is needed in order to provide high temperature stability. By using vinylene carbonate (VC) at amounts of between about 0.5 wt % and about 2.0 wt % results in balance of good low temperature performance and high temperature stability. A preferred amount of VC is about 1.0 wt %.

Some of the compounds used to improve the performance also affect the flammability. In particular the flammability of ethylene carbonate and vinylene carbonate are relatively high compared with other solvents. Therefore reducing the amount of these compounds can decrease the flammability. Replacing ethyl methyl carbonate with other compounds such as methyl butyrate, ethyl propionate, and butyl propionate can reduce the flammability. While individually many of these compounds (e.g., MB, VC, and cyclic phosphaze derivatives) have been shown to be effective at either improving wide temperature operation or reducing flammability, the combination of these compounds at appropriate amounts is required in order to impart the desired properties of reduced flammability and high-performance.

In one embodiment, the electrolyte may include a lithium salt from about 3% to about 20% (or to about 25% or to about 30%) by weight, a primary solvent from about 15% to about 25% by weight, wide-temperature co-solvents from about 14% to about 55% by weight, and a flame retardant compound from about 6% to about 60% by weight. In one implementation, an interface forming compounds from about 0.5% to about 2.0% by weight may also be included. A suitable lithium salt may be a salt selected from the group consisting of lithium hexafluorophosphate, lithium bistrifluoromethanesulfonimide (LiTFSI), lithium tetrafluoroborate (LiBF4), and combinations thereof. In one embodiment, the lithium salt may preferably be lithium hexafluorophosphate. The primary solvent may be a solvent selected from the group of solvents consisting of ethylene carbonate, diethyl carbonate, dimethyl carbonate, ethyl methyl carbonate, ethyl propionate, methyl butyrate, ethyl acetate, ethyl butyrate and/or 1,3-dioxolane, and mixtures thereof. In one embodiment, the primary solvent may preferably be ethylene carbonate. The wide-temperature co-solvent may be a solvent selected from the group consisting of ethylene carbonate, diethyl carbonate, dimethyl carbonate, ethyl methyl carbonate, ethyl propionate, methyl butyrate, ethyl acetate, ethyl butyrate and/or 1,3-dioxolane, and mixtures thereof. In one embodiment, the wide-temperature co-solvents may preferably be ethyl methyl carbonate.

A suitable wide-temperature co-solvent may be methyl butyrate or a mixture of ethyl methyl carbonate and methyl butyrate. The interface forming compound may be a compound selected from the groups consisting of vinylene carbonate, vinyl ethylene carbonate, lithium bis(oxalato) borate, and combinations thereof. The interface forming compound may preferably be vinylene carbonate. The flame retardant compound may be a compound selected from the group consisting of cyclic phosphonates, phosphonates, phosphates, ionic liquids, and combinations thereof. The flame retardant compound may preferably be 2-ethoxy-2,4,4,6,6-pentafluoro-1,3,5,2$\lambda^5$, 4$\lambda^5$, 6$\lambda^5$ triazatriphosphinine.

In another embodiment, the electrolyte include a lithium salt from about 9% to about 16% by weight; a primary solvent from about 16% to about 25% by weight; wide-temperature co-solvents from about 47% to about 53% by weight; and a flame retardant compound from about 12% to about 18% by weight. In another embodiment, the electrolyte includes a lithium salt from about 10% to about 16% by weight, the lithium salt including hexafluorophosphate; a primary solvent from about 16% to about 22% by weight, the primary solvent including ethylene carbonate; wide-temperature co-solvents from about 49% to about 52% by weight, the wide-temperature co-solvents including ethyl methyl carbonate and methyl butyrate; interface forming compounds from about 0.5% to about 2.0% by weight, the interface forming compounds including vinylene carbonate; and a flame retardant compound from about 10% to about 18% by weight, the flame retardant compound including 2-ethoxy-2,4,4,6,6-pentafluoro-1,3,5,2$\lambda^5$, 4$\lambda^5$, 6$\lambda^5$ triazatriphosphinine. In a still further embodiment, the electrolyte includes a lithium salt from about 9% to about 15% by weight, the lithium salt including hexafluorophosphate; a primary solvent from about 19% to about 25% by weight, the primary solvent including ethylene carbonate; wide-temperature co-solvents from about 47% to about 53% by weight, the wide-temperature co-solvents including ethyl methyl carbonate; interface forming compounds from about 0.5% to about 2.0% by weight, the interface forming compounds including vinylene carbonate; and a flame retardant compound from about 10% to about 18% by weight, the flame retardant compound including 2-ethoxy-2,4,4,6,6-pentafluoro-1,3,5,2$\lambda^5$, 4$\lambda^5$, 6$\lambda^5$ triazatriphosphinine.

With respect to the last two formulations presented herein above, a specific example of the electrolyte may be a combination of about 12.9% by weight lithium hexafluorophosphate, about 18.7% by weight ethylene carbonate, about 14.3% by weight ethyl methyl carbonate, about 38.1% by weight methyl butyrate, about 1.0% by weight vinylene carbonate, and 15.0% by weight 2-ethoxy-2,4,4,6,6-pentafluoro-1,3,5,2$\lambda^5$, 4$\lambda^5$, 6$\lambda^5$ triazatriphosphinine. Another specific example may be a combination of about 12.1% by weight lithium hexafluorophosphate, about 21.6% by weight ethylene carbonate, about 50.4% by weight ethyl methyl carbonate, 1.0% by weight vinylene carbonate, and 15.0% by weight 2-ethoxy-2,4,4,6,6-pentafluoro-1,3,5,2$\lambda^5$, 4$\lambda^5$, 6$\lambda^5$ triazatriphosphinine.

The present invention will now be illustrated by reference to the following non-limiting working examples wherein procedures and materials are solely representative of those which can be employed, and are not exhaustive of those available and operative. Examples I-VI and the accompanying test methods illustrate the advantages of an electrolyte based on specific combinations of compounds that result in an electrolyte with reduced flammability and wide temperature range operation.

Example I

Electrolytes were prepared in an inert atmosphere (Argon) glovebox by combining salts, solvents, co-solvents, and additives. Compounds were obtained from chemical manufacturers or suppliers. Specific compositions prepared are shown in Table 2. The structures of selected electrolyte components grouped as classes of compounds are shown in Table 2. The structures of selected electrolyte components grouped as classes of compounds are shown in FIGS. 1A, 1B, 1C, and 1D. The compound names and their abbreviations are listed as follows:

Salts
Lithium hexafluorophosphate (LiPF$_6$)
Lithium bistrifluoromethanesulfonimide (LiTFSI)
Lithium tetrafluoroborate (LiBF$_4$)
Solvents/Co-Solvents
Ethylene carbonate (EC)
Diethyl carbonate (DEC)
Dimethyl carbonate (DMC)
Ethyl methyl carbonate (EMC)
Ethyl Propionate (EP)
Methyl Butyrate (MB)
Flame Retardant Compounds
Tris(2,2,2-trifluoroethyl) phosphate (TTFEP) (FRA-A)
Dimethyl methylphosphonate (DMMP) (FRA-B)
Trimethyl phosphate (TMP) (FRA-C)
2-Ethoxy-2,4,4,6,6-pentafluoro-1,3,5,2$\lambda^5$, 4$\lambda^5$, 6$\lambda^5$ triazatriphosphinine (Phoslyte—Hishicolin E, CP1, FRA-D)
1-ethyl-3-methylimidazolium bis(trifluoromethylsulfonyl) imide (EMI-TFSI) (FRA-E)
2,4,6-Tris(trifluoromethyl)-1,3,5-triazine (TTFMT)
Solid Electrolyte Interface Formers/Wide Temperature Additives
Vinylene carbonate (VC) (WTA-A)
Lithium bis(oxalato)borate (LiBOB)
Dimethyl acetamide (DMAC)

Component amounts were measured by mass and are shown by percent by weight, i.e., weight percent (wt. %), within the combined electrolyte. For the salt, the molarity was also calculated. The use of glass vials was avoided due to risk of contamination due to etching from free hydrogen fluoride; therefore, electrolytes were prepared and stored in 99.5% pure aluminum bottles obtained from Elemental Container. The notation used for the electrolytes consists of a base letter (F in this case) followed by a three digit number to identify the composition (e.g., 001). Then a group identifier is included (Group A: Control Electrolyte; Group B: Electrolyte that included a wide temperature additive (WTA); Group C: Electrolyte that includes a flame retardant additive (FRA); and Group D: Electrolyte that includes a WTA and a FRA). Following this, a specific batch number is included (e.g., '01', '02').

For comparison, baseline electrolytes obtained from commercial vendors (e.g., Novoltye, MTI, or BASF). These baseline electrolytes were 1M $LiPF_6$ in EC:DEC (1:1 v/v) (Novolyte) (notated as control electrolyte-A "CE-A") and 1M $LiPF_6$ in EC+DMC+DEC (1:1:1 vol ratio) (MTI) (notated as "CE-B"), and 1.2 M $LiPF_6$ in EC:EMC (3:7 et %) (notated as "CE-C").

To prevent exposure to moisture which will degrade the electrolyte, all electrolytes were stored in an inert atmosphere (Arbon) glovebox. Water levels in the electrolyte were determined using Karl-Fisher titration for selected samples.

TABLE 2

Electrolyte compositions describing the mass ratio of each of the components.

| | Salt | | | Primary Solvents | | Wide Temperature Addtives (WTA) | | | | | Flame Retardant Addtive (FRA) | | |
|---|---|---|---|---|---|---|---|---|---|---|---|---|---|
| Notation | Salt Comp. | Salt (wt %) | Molarity (M) | EC (wt %) | EMC (wt %) | MB (wt %) | EP (wt %) | VC (wt %) | LiBOB (wt %) | DMAC (wt %) | FRA (wt %) | FRA Comp. | FRA Notation |
| F-001-A-XX | $LiPF_6$ | 11.5 | 1.0 | 50.1 | 38.3 | | | | | | | | |
| F-002-B-XX | $LiPF_6$ | 12.6 | 1.0 | 28.5 | 28.5 | 28.5 | | 2.0 | | | | | |
| F-003-D-XX | $LiPF_6$ | 11.3 | 1.0 | 25.6 | 25.6 | 25.6 | | 1.8 | | | 10.0 | CP1 | FRA-D |
| F-004-B-XX | $LiPF_6$ | 12.6 | 1.0 | 21.5 | 49.4 | | 14.5 | 2.0 | | | | | |
| F-005-D-XX | $LiPF_6$ | 11.3 | 1.0 | 19.4 | 44.4 | | 13.0 | 1.8 | | | 10.0 | CP1 | FRA-D |
| F-006-B-XX | $LiPF_6$ | 14.8 | 1.2 | 21.0 | 48.1 | | 14.1 | 2.0 | | | | | |
| F-007-D-XX | $LiPF_6$ | 13.3 | 1.2 | 18.9 | 43.3 | | 12.7 | 1.8 | | | 10.0 | CP1 | FRA-D |
| F-008-D-XX | $LiPF_6$ | 11.8 | 1.2 | 16.8 | 38.5 | | 11.3 | 1.6 | | | 20.0 | CP1 | FRA-D |
| F-009-D-XX | $LiPF_6$ | 11.8 | 1.2 | 16.8 | 38.5 | | 11.3 | 1.6 | | | 20.0 | TMP | FRA-C |
| F-010-D-XX | $LiPF_6$ | 11.8 | 1.2 | 16.8 | 38.5 | | 11.3 | 1.6 | | | 20.0 | DMMP | FRA-B |
| F-011-D-XX | $LiPF_6$ | 11.8 | 1.2 | 16.8 | 38.5 | | 11.3 | 1.6 | | | 20.0 | TTFEP | FRA-A |
| F-012-D-XX | $LiPF_6$ | 11.8 | 1.2 | 16.8 | 38.5 | | 11.3 | 1.6 | | | 20.0 | TTFMT | FRA-F |
| F-013-D-XX | $LiPF_6$ | 13.0 | 1.2 | 21.9 | 51.1 | | | 2.0 | 2.0 | | 10.0 | CP1 | FRA-D |
| F-014-D-XX | $LiPF_6$ | 14.3 | 1.2 | 24.2 | 56.5 | | | 2.0 | 2.0 | 1.0 | | | |
| F-015-D-XX | $LiPF_6$ | 12.8 | 1.2 | 21.7 | 50.5 | | | 2.0 | 2.0 | 1.0 | 10.0 | CP1 | FRA-D |
| F-016-D-XX | $LiPF_6$ | 13.0 | 1.2 | 18.5 | 42.5 | | 12.4 | 1.8 | 2.0 | | 9.8 | CP1 | FRA-D |
| F-017-D-XX | $LiPF_6$ | 12.9 | 1.2 | 18.3 | 42.0 | | 12.3 | 1.8 | 2.0 | 1.0 | 9.7 | CP1 | FRA-D |
| F-018-D-XX | $LiPF_6$ | 10.9 | 1.2 | 15.8 | 48.2 | 10.7 | | 1.7 | 2.0 | 1.0 | 9.7 | CP1 | FRA-D |
| F-019-D-XX | $LiPF_6$ | 13.1 | 1.2 | 22.2 | 51.7 | | | 2.0 | | 1.0 | 10.0 | CP1 | FRA-D |
| F-020-D-XX | $LiPF_6$ | 11.6 | 1.2 | 19.6 | 45.8 | | | 2.0 | | 1.0 | 20.0 | CP1 | FRA-D |
| F-021-D-XX | $LiPF_6$ | 13.1 | 1.2 | 18.7 | 45.9 | | 12.6 | 1.8 | | 1.0 | 9.9 | CP1 | FRA-D |
| F-022-D-XX | $LiPF_6$ | 11.7 | 1.2 | 16.6 | 38.1 | | 11.2 | 1.6 | | 1.0 | 19.8 | CP1 | FRA-D |
| F-023-D-XX | $LiPF_6$ | 13.3 | 1.2 | 22.4 | 52.3 | | | 2.0 | | | 10.0 | CP1 | FRA-D |
| F-024-D-XX | $LiPF_6$ | 11.7 | 1.2 | 19.9 | 46.4 | | | 2.0 | | | 20.0 | CP1 | FRA-D |
| F-025-D-XX | $LiPF_6$ | 13.0 | 1.2 | 18.9 | 43.3 | 12.8 | | 2.0 | | | 10.0 | CP1 | FRA-D |
| F-026-D-XX | $LiPF_6$ | 11.5 | 1.2 | 16.7 | 38.4 | 11.4 | | 2.0 | | | 20.0 | CP1 | FRA-D |
| F-027-B-XX | $LiPF_6$ | 14.8 | 1.2 | 25.0 | 58.2 | | | 2.0 | | | | | |
| F-028-C-XX | $LiPF_6$ | 13.6 | 1.2 | 22.9 | 53.5 | | | | | | 10.0 | CP1 | FRA-D |
| F-029-C-XX | $LiPF_6$ | 12.1 | 1.2 | 20.4 | 47.5 | | | | | | 20.0 | CP1 | FRA-D |
| F-030-B-XX | $LiPF_6$ | 15.4 | 1.2 | 22.3 | 16.9 | 45.4 | | | | | | | |
| F-031-B-XX | $LiPF_6$ | 15.1 | 1.2 | 21.8 | 16.6 | 44.5 | | 2.0 | | | | | |
| F-032-D-XX | $LiPF_6$ | 13.8 | 1.2 | 20.0 | 15.3 | 40.9 | | | | | 10.0 | CP1 | FRA-D |
| F-033-D-XX | $LiPF_6$ | 13.5 | 1.2 | 19.6 | 14.9 | 40.0 | | 2.0 | | | 10.0 | CP1 | FRA-D |
| F-034-B-XX | $LiPF_6$ | 15.3 | 1.2 | 22.1 | 16.9 | 45.2 | | 0.5 | | | | | |
| F-035-B-XX | $LiPF_6$ | 15.2 | 1.2 | 22.0 | 16.8 | 45.0 | | 1.0 | | | | | |
| F-036-B-XX | $LiPF_6$ | 15.1 | 1.2 | 21.9 | 16.7 | 44.7 | | | 1.6 | | | | |
| F-037-D-XX | $LiPF_6$ | 13.8 | 1.2 | 19.9 | 15.2 | 40.6 | | 0.5 | | | 10.0 | CP1 | FRA-D |
| F-038-D-XX | $LiPF_6$ | 13.7 | 1.2 | 19.8 | 15.1 | 40.4 | | 1.0 | | | 10.0 | CP1 | FRA-D |
| F-039-D-XX | $LiPF_6$ | 14.6 | 1.2 | 21.2 | 16.1 | 43.1 | | | | | 5.0 | CP1 | FRA-D |
| F-040-D-XX | $LiPF_6$ | 13.1 | 1.2 | 18.9 | 14.4 | 38.6 | | | | | 15.0 | CP1 | FRA-D |
| F-041-D-XX | $LiPF_6$ | 12.3 | 1.2 | 17.9 | 13.5 | 36.3 | | | | | 20.0 | CP1 | FRA-D |
| F-042-D-XX | $LiPF_6$ | 14.5 | 1.2 | 21.1 | 16.0 | 42.9 | | 0.5 | | | 5.0 | CP1 | FRA-D |
| F-043-D-XX | $LiPF_6$ | 13.0 | 1.2 | 18.8 | 14.3 | 38.4 | | 0.5 | | | 15.0 | CP1 | FRA-D |
| F-044-D-XX | $LiPF_6$ | 12.2 | 1.2 | 17.7 | 13.5 | 36.1 | | 0.5 | | | 20.0 | CP1 | FRA-D |
| F-045-D-XX | $LiPF_6$ | 12.9 | 1.2 | 18.7 | 14.3 | 38.1 | | 1.0 | | | 15.0 | CP1 | FRA-D |
| F-046-D-XX | $LiPF_6$ | 12.1 | 1.2 | 21.6 | 50.4 | | | 1.0 | | | 15.0 | CP1 | FRA-D |
| F-052-D-XX | $LiPF_6$ | 11.6 | 1.2 | 16.6 | 12.7 | 34.1 | | | | | 25.0 | CP1 | FRA-D |
| F-053-D-XX | $LiPF_6$ | 7.7 | 1.2 | 11.1 | 8.5 | 22.7 | | | | | 50.0 | CP1 | FRA-D |
| F-054-D-XX | $LiPF_6$ | 6.2 | 1.2 | 8.9 | 6.7 | 18.2 | | | | | 60.0 | CP1 | FRA-D |
| F-055-D-XX | $LiPF_6$ | 3.9 | 1.2 | 5.5 | 4.2 | 11.4 | | | | | 75.0 | CP1 | FRA-D |
| F-057-B-XX | $LiPF_6$ | 14.3 | 1.2 | 25.4 | 59.4 | | | 1.0 | | | | | |
| F-058-D-XX | $LiPF_6$ | 7.1 | 1.2 | 12.6 | 29.4 | | | 1.0 | | | 50.0 | CP1 | FRA-D |
| F-059-D-XX | $LiPF_6$ | 5.6 | 1.2 | 10.0 | 23.4 | | | 1.0 | | | 60.0 | CP1 | FRA-D |
| F-060-D-XX | $LiPF_6$ | 3.5 | 1.2 | 6.2 | 14.4 | | | 1.0 | | | 75.0 | CP1 | FRA-D |

Example II

Electrolyte flammability was measured using multiple methods including "wick tests", flash point tests, and oxygen calorimetry tests. For the wick tests, a ~1.5 inch piece of glass fiber tape saturated with 1 mL of the electrolyte. The saturated glass fiber tape was suspended above an alcohol burner (using denatured ethanol as the fuel) to a position in which the tip of the flame contacted the mid-point of the glass fiber tape. The flame height and burn time were recorded. Two to five trials were performed for each electrolyte, and trials were recorded with video. Averages of initial burn time and initial flame height were calculated. The mass normalized self-extinguishing time was determined from the mass and burn time. To determine flash points of electrolytes, samples were tested by Galbraith Laboratories using ASTM D56 and D93 methods. For electrolytes with flash points expected to be below 80° C., the ASTM D56 (Tag Closed Cup) test was performed. For electrolytes with flash points expected to be above 80° C., the ASTM D93 (Closed Cup) test was performed. Selected samples were also sent to Southwest Research Institute (SwRI) for oxygen consumption calorimetry tests according to ASTM E 1354-1 (Standard Test Method for Heat and Visible Smoke Release Rates for Materials and Products Using an Oxygen Consumption calorimeter) using a at a heat flux of 15 kW/m$^2$.

The flammability properties of candidate electrolytes and a baseline electrolyte are shown in Table 3. The data shows that the candidate electrolytes show significantly lower flammability compared with the baseline electrolyte composition.

TABLE 3

Comparison of flammability of candidate electrolytes from testing performed.

| Category | Candidate Electrolyte | Flame Retardant Additive (FRA) FRA ID | % FRA | Mass Normalized Self-Extinguishing Time (sec/g) | Time to ignition from ASTM E 1354-10 (sec) | Flash point (°C.) |
|---|---|---|---|---|---|---|
| Baseline | CE-C | — | 0 | 19.4 | 7 | 26 |
| A | F-006-B | — | 0 | 20.8 | 8 | N/A |
|  | F-007-D | D | 10 | 1.7 | 14 | N/A |
|  | F-008-D | D | 20 | 0.5 | 26 | N/A |
| B | F-030-B | — | 0 | 18.4 | N/A | 16 |
|  | F-039-D | D | 5 | 23.7 | N/A | N/A |
|  | F-032-D | D | 10 | 2.3 | 13.3 | 24 |
|  | F-040-D | D | 15 | 2.0 | 25.7 | >100 |
|  | F-041-D | D | 20 | 1.2 | N/A | N/A |

Each of the three different flammability tests performed shows similar trends. The conventional electrolyte (CE-C) easily caught fire. However the flammability was decreased by increasing the amounts of flame retardant additive.

The flashpoints of selected electrolytes are shown in Table 4. The compositions of these electrolytes are described in Example I. The flash point is the lowest temperature at which a liquid will form an explosive vapor under normal atmospheric conditions. It is an important measurement of volatility and allows appropriate safety measures to be taken when transporting, storing or handling flammable liquids. Liquids are classified on the basis of flash point measurement: extremely flammable, having a flash point lower than 0° C. and a boiling point less than 35° C.; highly flammable, having a flash point below 21° C.; and flammable, having a flash point between 21° C. and 55° C. A liquid with a flash point in the range 32° C.-55° C. may not require as many precautions in use as it will not form an explosive atmosphere unless it is stored at elevated temperature. A flash point >93° C. is not a combustible liquid. With electrolyte composition F-040-D (with 15 wt % FRA-D), the flashpoint increased to >100° C. and therefore this would be considered a non-combustible liquid based on the flash point tests.

TABLE 4

Results of the flashpoint tests for various electrolytes.

| Electrolyte ID | % FRA | Testing | Flash Point (° C.) |
|---|---|---|---|
| CE-C2 | 0 | ASTM D 56-05 | 26 |
| F-030-B | 0 | ASTM D56-05 | 16 |
| F-032-D | 10 | ASTM D93-11 | 24 |
| F-040-D | 15 | ASTM D93-11 | >100 |

Different electrolytes with the same amount of flame retardant additive resulted in different flammabilities as can be observed from the data in Table 3. Therefore, the flammability is affected by additional components in the electrolyte in addition to the flame retardant additive. The flammabilities of solvents used in the electrolyte were evaluated using the wick test method and the data is presented in [0057] Table 5. This data supports that different solvents can increase or decrease the flammability. In particular, the mass normalized self extinguishing times of ethylene carbonate and vinylene carbonate are relatively higher than other solvents. Therefore reducing the amount of ethylene carbonate and vinylene carbonate can decrease the flammability. In addition, reducing or replacing ethyl methyl carbonate with other compounds such as methyl butyrate, ethyl propionate, and butyl propionate can reduce the flammability. The testing also supported that the flame retardant additives were indeed non-flammable.

TABLE 5

Flammability test results for electrolyte components and additives comparing average maximum flame heights and mass normalized self-extinguishing times.

| Candidate Electrolyte Component/Additive | Average Maximum Flame Height (in) | Mass Normalized Self-Extinguishing Time (sec/g) |
|---|---|---|
| Ethylene Carbonate (EC) | 5.6 | 30.8 |
| Diethyl Carbonate (DEC) | 9 | 17.9 |
| Dimethyl Carbonate (DMC) | 7.5 | 15.9 |
| Ethyl Methyl Carbonate (EMC) | 8.9 | 15.5 |
| Vinylene Carbonate (VC) | 7.2 | 23.2 |

TABLE 5-continued

Flammability test results for electrolyte components and additives comparing average maximum flame heights and mass normalized self-extinguishing times.

| Candidate Electrolyte Component/Additive | Average Maximum Flame Height (in) | Mass Normalized Self-Extinguishing Time (sec/g) |
|---|---|---|
| Ethyl Propionate (EP) | 12.2 | 12.9 |
| Methyl Propionate (MP) | 9.8 | 11.5 |
| Methyl Butyrate (MB) | 11.5 | 13.2 |
| 2,4,6-Tris(trifluoromethyl)-1,3,5-triazine (TTFMT) | 0 | 0 |
| Hishicolin E (HE) | 0 | 0 |

Different flame retardant additives can be used to reduce the flammability of the electrolyte. The effectiveness of different flame retardant additives (FRAs) in a specific formulation was evaluated. Electrolytes prepared with 20 wt % of various FRAs are compared in Table 6. From this data, 2-ethoxy-2,4,4,6,6-pentafluoro-1,3,5,2$\lambda^5$, 4$\lambda^5$, 6$\lambda^5$ triazatriphosphinine, the cyclic phosphazene derivative (Hishicolin E, FRA-D), showed the most significant reduction in the flammability of the electrolyte.

TABLE 6

Comparison of a baseline electrolyte with no flame retardant additive (FRA) against electrolytes that contained 20 wt % FRA in addition to the baseline electrolyte.

| Candidate Electrolyte | Flame Retardant Additive (FRA) | | Mass Normalized Self-Extinguishing Time (sec/g) |
|---|---|---|---|
| | FRA ID | % FRA | |
| F-006-B-01 | — | 0 | 20.8 |
| F-011-D-01 | TTFEP | 20 | 16.9 |
| F-010-D-01 | DMMP | 20 | 13.5 |
| F-009-D-01 | TMP | 20 | 13.2 |
| F-008-D-01 | FRA-D | 20 | 0.5 |
| F-012-D-01 | EMI-TFSI | 20 | 21.7 |

To determine the amount of FRA-D needed to reduce the flammability, the FRA-D wt % was varied and the electrolyte composition was kept constant. Compositions of electrolytes prepared are shown in Table 7.

TABLE 7

Electrolyte compositions with solvents/additives corresponding to relative wt %, and flame retardant additive relating to wt %.

| | Salt | | Solvents/Additives (Relative-wt %) | | |
|---|---|---|---|---|---|
| Notation | Composition | Molarity (M) | EC (%) | EMC (%) | FRA-D (wt %) |
| NFE-O-A01 | LiPF$_6$ | 1.2 | 3 | 7 | 2 |
| NFE-O-A02 | LiPF$_6$ | 1.2 | 3 | 7 | 4 |
| NFE-O-A03 | LiPF$_6$ | 1.2 | 3 | 7 | 6 |
| NFE-O-A04 | LiPF$_6$ | 1.2 | 3 | 7 | 8 |
| NFE-O-A05 | LiPF$_6$ | 1.2 | 3 | 7 | 10 |
| NFE-O-A06 | LiPF$_6$ | 1.2 | 3 | 7 | 20 |

In Table 8, corresponding mass normalized self extinguishing time and average maximum flame height are shown from the results of three wick tests. Flammability categories were designated according to individual self-extinguishing time. The criteria used for designating the electrolyte as nonflammable flame retardant or flammable were based on the mass-normalized self extinguishing time (SET): <1 sec/g: non-flammable; 1-10 sec/g: flame retardant; >10 sec/g flammable. Shown in FIG. 2 is a graph of the wt % of the NFA and the self extinguishing time. The data shows that for this electrolyte composition, the electrolyte becomes flame retardant at a wt % of between about 8% to about 10% and becomes non-flammable from this test and criteria at a composition of >10 wt %. Therefore of composition of about 10 wt % and preferably higher is needed to impart flame retardant properties to the electrolyte.

TABLE 8

Flammability testing of electrolytes with different amounts of FRA-D.

| Electrolyte | Average Maximum Flame Height During Flame Exposure (in) | Mass Normalized Self Extinguishing Time (sec/g) | Flammability Category |
|---|---|---|---|
| NFE-O-A01 | 7 | 20.1 | Flammable |
| NFE-O-A02 | 7 | 18.1 | Flammable |
| NFE-O-A03 | 7 | 17.8 | Flammable |
| NFE-O-A04 | 3 | 11.3 | Flammable |
| NFE-O-A05 | 2.5 | 1.4 | Flame Retardant |
| NFE-O-A06 | 0.3 | 0.3 | Non-Flammable |

Example III

The ionic conductivity for the electrolytes was evaluated in order to determine the performance of the electrolyte over wide temperature ranges. To measure conductivity, a Mettler-Toledo InLab 710 conductivity cell with an in-house fabricated air-tight holder was used. The cell was assembled in an inert atmosphere glovebox and then sealed completely before removal for measurements. The air-tight holder for the conductivity was fabricated to provide an air-tight seal and prevent exposure of the electrolytes to ambient humidity during the conductivity testing. Once removed, the cell was placed inside a Cincinnati Sub-Zero Microclimate 1.2 benchtop environmental chamber. The conductivity probe was connected to an Agilent 4338B Milliohmmeter for measuring resistance. Conductivity was determined from dividing the provided cell constant (0.8 cm$^{-1}$) by the measured resistance.

Figure 3:
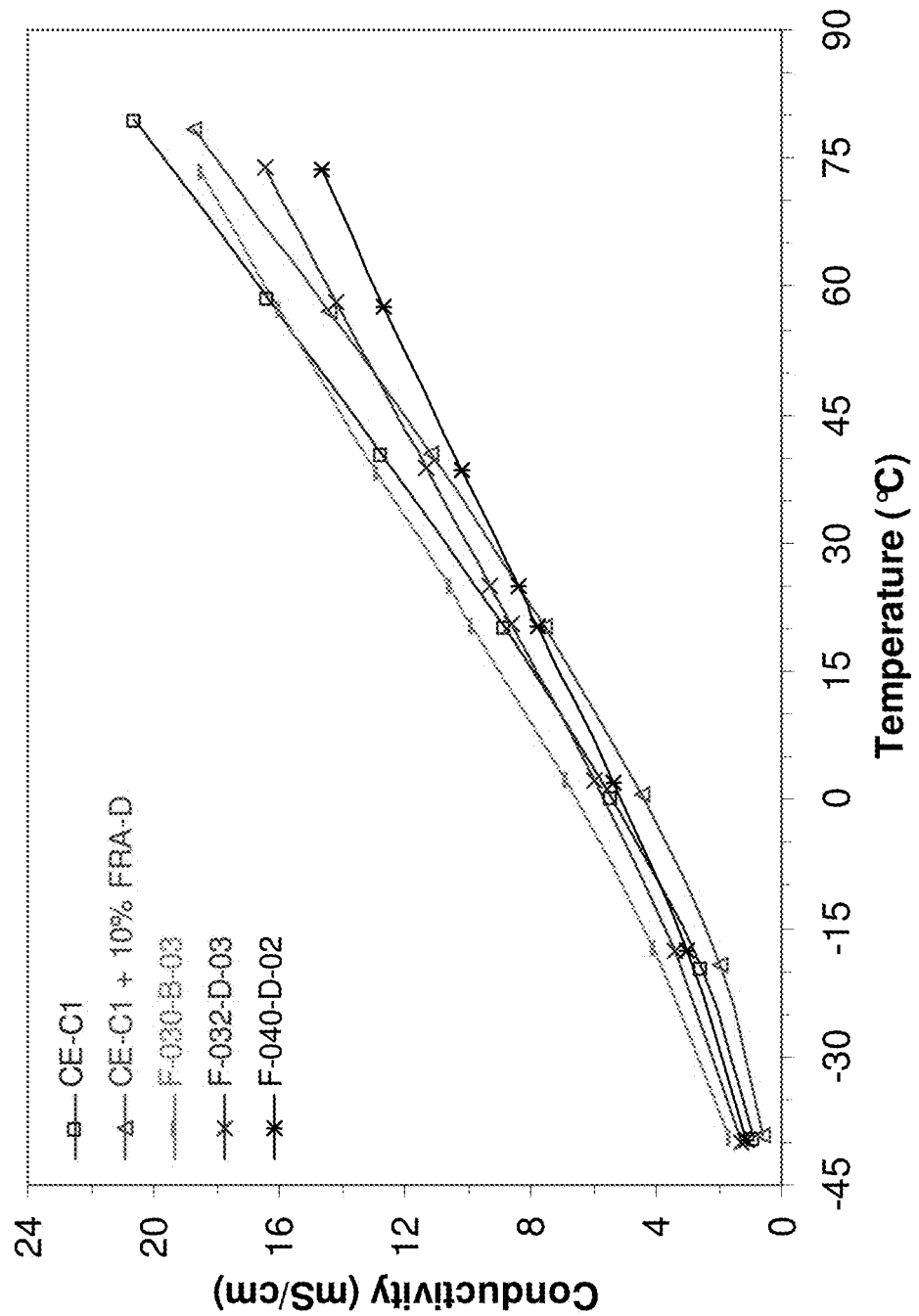
FIG. 3 is a graph showing the ionic conductivity of electrolytes as a function of temperature.

The ionic conductivity of selected electrolytes was evaluated in comparison with baselines over a wide temperature range, and data is presented in FIG. 3. The graph of the ionic conductivities as a function of temperature is shown in FIG. 2. The ionic conductivity was evaluated from −40° C. to at least +60° C. or higher for specific compositions. The addition of 10 wt % FRA-D was shown to slightly decrease the ionic conductivity compared to the baseline electrolytes (either CE-C or F-030-B). The baseline (CE-C1) has very poor performance at −40° C. and adding 10% of the flame retardant (FRA-D) further decreased low temperature performance.

TABLE 9

Ionic conductivity values over wide temperature ranges.

| Electrolyte | Conductivity (mS/cm) at Given Temperatures ||||||||| 
| | 80° C. ± 2° C. | 75° C. ± 2° C. | 60° C. ± 4° C. | 40° C. ± 2° C. | 25° C. ± 1° C. | 20° C. ± 2° C. | 0° C. ± 3° C. | −20° C. ± 3° C. | −40° C. ± 1° C. |
| --- | --- | --- | --- | --- | --- | --- | --- | --- | --- |
| CE-C1 | 20.58 | — | 16.34 | 12.78 | — | 8.83 | 5.43 | 2.60 | 0.87 |
| CE-C1 + 10% FRA-D | 18.68 | — | 14.44 | 11.19 | — | 7.55 | 4.45 | 1.98 | 0.58 |
| F-030-B-03 | — | 18.46 | 16.00 | 12.91 | 10.59 | 9.85 | 6.90 | 4.06 | 1.65 |
| F-032-D-03 (10% FRA-D) | — | 16.48 | 14.21 | 11.32 | 9.25 | 8.57 | 5.93 | 3.38 | 1.27 |
| F-040-D-02 (15% FRA-D) | — | 14.62 | 12.69 | 10.22 | 8.36 | 7.75 | 5.34 | 3.05 | 1.16 |

Using the wide temperature composition F-030-B, the addition of FRA-D in either 10 wt % (F-032-D) or 15 wt % (F-040-D) resulted in electrolyte with very good room temperature conductivity and low temperature conductivity. The conductivity at −40° C. for the F-040-D with 15 wt % FRA-D as a flame retardant additive is higher than the conventional electrolyte (CE-C1). This shows that proper combinations of additives can result in an electrolyte with reduced flammability and improved low temperature performance. Adding compounds such as methyl butyrate in specific amounts improves the low temperature ionic conductivity of flame retardant electrolytes.

Example IV

The effect of the flame retardant additives on cell performance is critically important. Electrolyte containing flame retardant additives and additional compounds were evaluated in cells. The performance of the electrolyte was determined from galvanostatic cycling tests and electrochemical impedance spectroscopy measurements.

The electrolyte was with cells containing a nickel cobalt aluminum (NCA) cathode and a graphite anode. The cathode material consisted of ~80% nickel cobalt aluminum (NCA) cathode powders ($LiNi_xCo_yAl_zO_2$) coated single-sided on aluminum foil. The anodes consisted of ~95% graphite powders coated single-sided on copper foil. The additional non-active material consisted of a conductive additive and a binder. Packaged CR2032 coin cells were fabricated as half cells and full cells. For half cells (using Li metal), the assembly in the coin cells consists of two electrodes (Li metal and cathode or anode), a separator (Celgard 2500), one or more stainless steel spacers, and a nickel foam pellet. The nickel foam was used as a spacer and to provide compression of the electrodes and separator and to reduce the distance between the electrodes. After assembly of the electrodes and spacer, the electrolyte was added to the assembly and the coin cell was sealed. A similar procedure was used for preparing full cells where Li metal is replaced with the graphite anode. Galvanostatic charge-discharge measurements were performed on an Arbin Instruments battery test station.

Two-point probe electrochemical impedance spectroscopy (EIS) measurements were obtained using a Princeton Applied Research (PAR) VersaStat MC potentiostat operated with VersaStudio software. An applied root mean square amplitude of 50 mV was used over the frequency range of 1.0 MHz to 0.1 Hz, and data was taken at open circuit potential in either the charged or discharged state. Temperature was controlled with a Cincinnati Sub-Zero Microclimate 1.2 benchtop environmental chamber. For the NCA cathode half cell tests, the voltage window used was 3.0-4.1 V vs. Li. For the graphite anode, the voltage range was 0.0-1.5 V vs. Li. Full cell tests used the same voltage range as used for the cathode half cells. Specifically, upon completion of full cell fabrication, the coin cells typically showed on open circuit potential of ~0 V and thus were immediately placed on the Arbin test station to undergo a brief 'bump' charge at C/10 rate to 2.5V. After the initial 'bump' charge, the cells were allowed to rest for 12 hours to allow the electrodes and separator membrane to be fully wetted. Once the 12 hour rest period was completed, the cells underwent 5 formation cycles with one cycle being defined as a charge step to 4.1V and a discharge step to 3.0V at a rate of C/10, with 5 minute rest steps between each charge and discharge and monitoring open circuit potential (OCP). Upon completion of formation cycles, the cells were used for further testing. For anode half cells, the open circuit potential after fabrication was typically between 1.3V to 1.7V, thus no 'bump' charge was necessary. The OCP would increase to between 1.5V to 1.8V during the 12 hour rest period. After the rest period, cells underwent 5 formation cycles with one cycle defined as a charge to 0.0V followed by a discharge to 1.5V at a rate of C/10, with 5 minute rest steps between each charge and discharge, and monitoring OCP. After formation cycles were completed, the cells were further tested.

Figure 4:
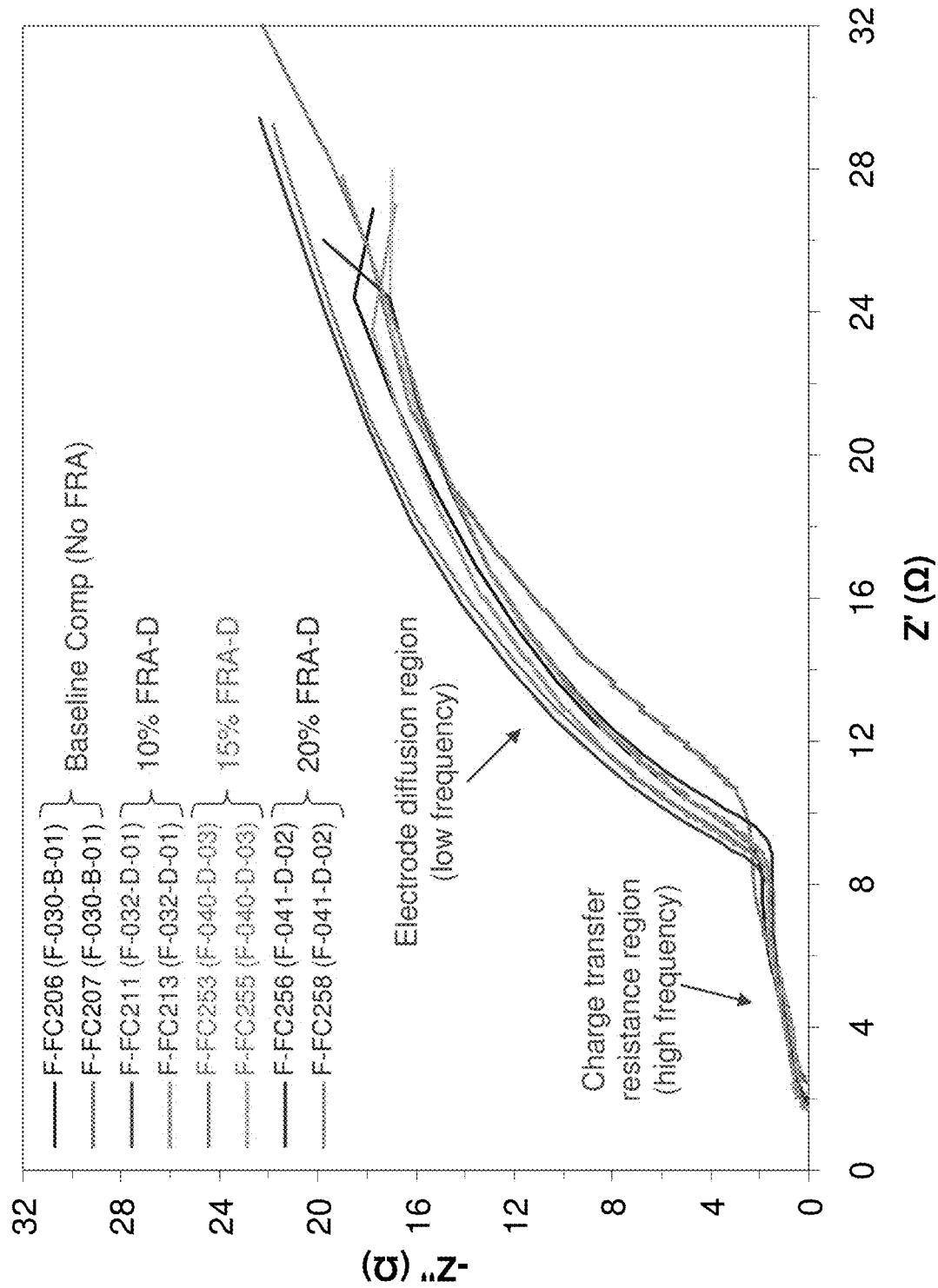
FIG. 4 is a graph showing the electrochemical impedance spectra of full cells containing electrolytes with different amounts of flame retardant additive (FRA-D) and the comparison with the baseline electrolyte.

Electrochemical impedance analysis of full cells was performed to determine the effect of different electrolyte compositions on the cell resistance. The affect of amount of flame retardant additive, FRA-D, on the impedance was determined. The cells were tested in a discharged state (~3.0V) after 5 formation cycles. As shown in FIG. 4, the amount of FRA-D up to 20 wt % has no negative effect on the high frequency charge transfer resistance, and at 10% and 15% FRA-D additive amount may slightly decrease the charge transfer resistance. This data supports that the interfacial charge transfer resistance is not negatively affected by the addition of the flame retardant additive at concentrations of 10-20 wt % within the specific electrolyte composition evaluated. Therefore, the interface is very similar to the baseline composition without the flame retardant additive. This desirable result supports that the electrolyte containing the flame retardant additive will provide high performance and not significantly increase the interfacial resistance of the cell.

The ability of the electrolytes containing the flame retardant compounds to provide good electrochemical performance is also supported by galvanostatic charging and discharging experiments. The effect of different additives including the flame retardant additive (FRA) and other wide temperature additives (WTAs) on the formation cycles is very important. The formation cycles are the initial cycles during which time the solid electrolyte interface layer forms. Additional plateaus observed during the formation cycles would indicate that a different interface layer may be formed from the compounds.

Figure 5:
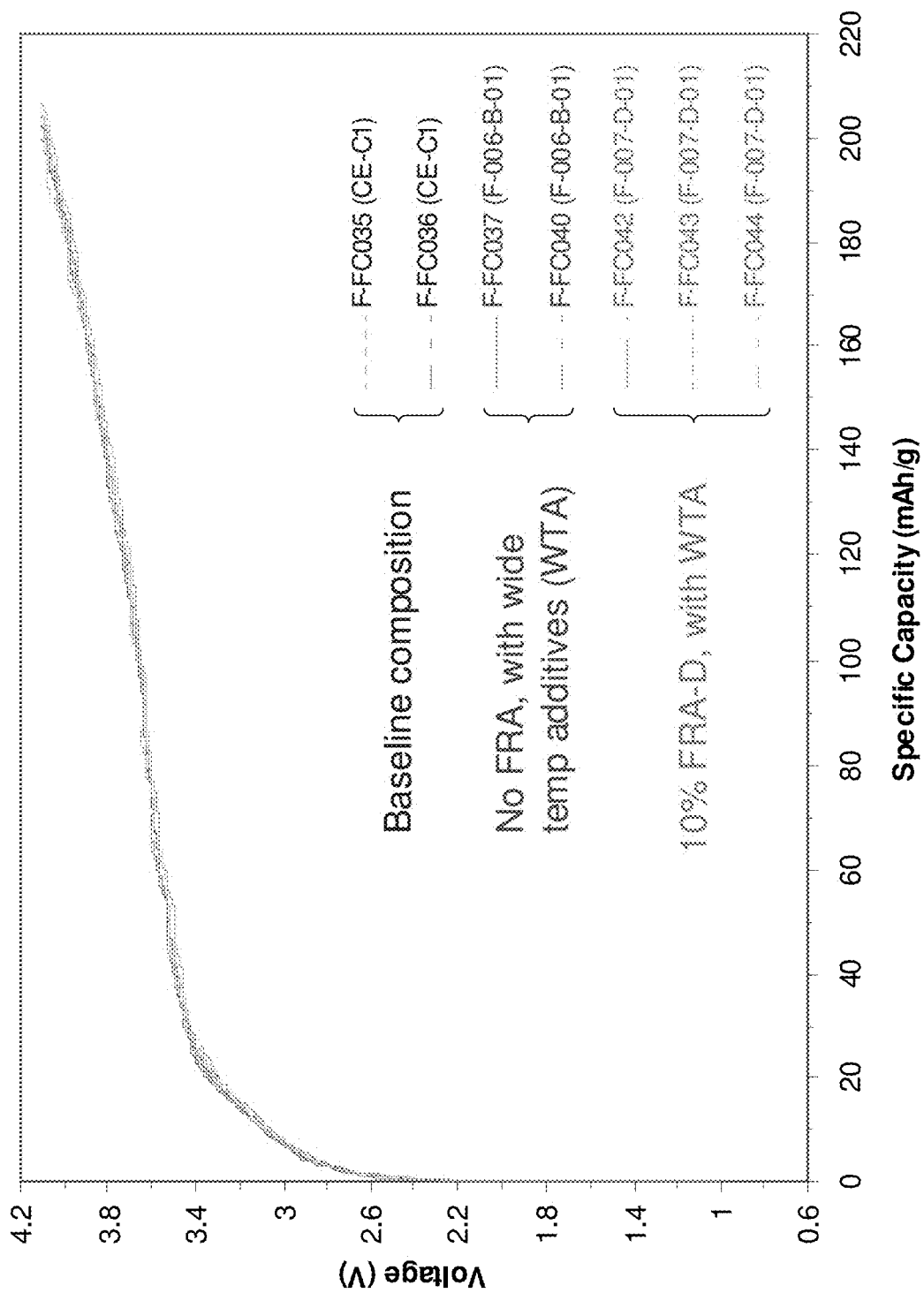
FIG. 5 is a graph showing the voltage profile of first formation charge cycle for full cell coin cells comparing various electrolytes.
Figure 6:
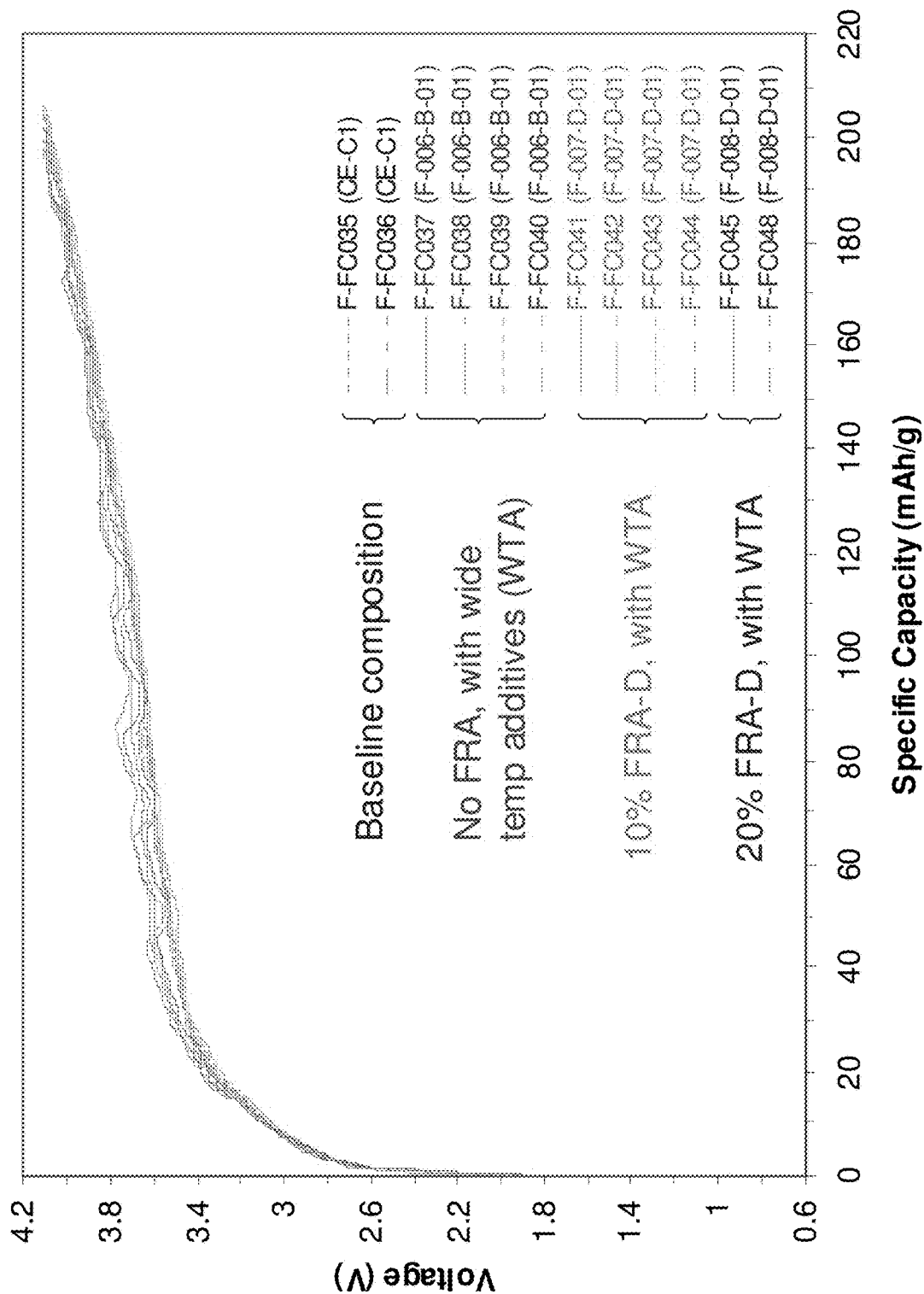
FIG. 6 is a graph showing the voltage profile of first formation charge cycle for additional full cell coin cells with various electrolytes.
Figure 7:
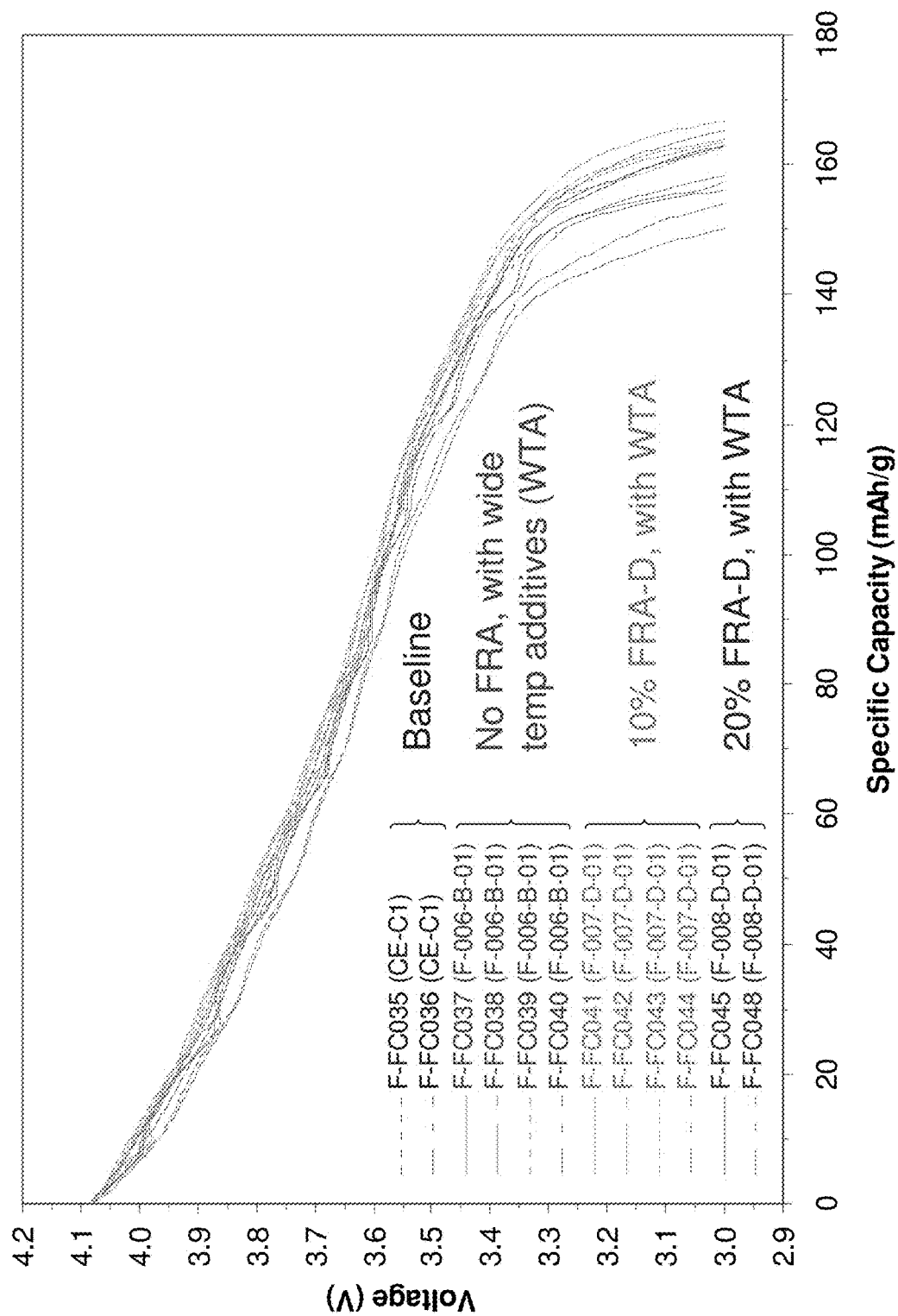
FIG. 7 is a graph showing the voltage profile of the first formation discharge cycle for full cell coin cells with various electrolytes.

FIG. 5 shows the first formation cycle charge of cells with various electrolytes, indicating the WTA (ethyl propionate) and FRA (FRA-D) do not negatively affect the cell performance. FIG. 6 shows the same information, however it includes additional cells. In all cells, some voltage fluctuations were observed and attributed to variations in the temperature of the room; however the additional cells shown in FIG. 6 displayed greater temperature fluctuations. FIG. 7 shows the first formation discharge cycle of cells with various electrolytes and displays the expected typical capacities of ca. 160 mA/g. Again some fluctuations are observed and attributed to temperature variance. Overall, the initial formation shows no indication of a negative performance influences by the WTA or FRA.

Figure 8:
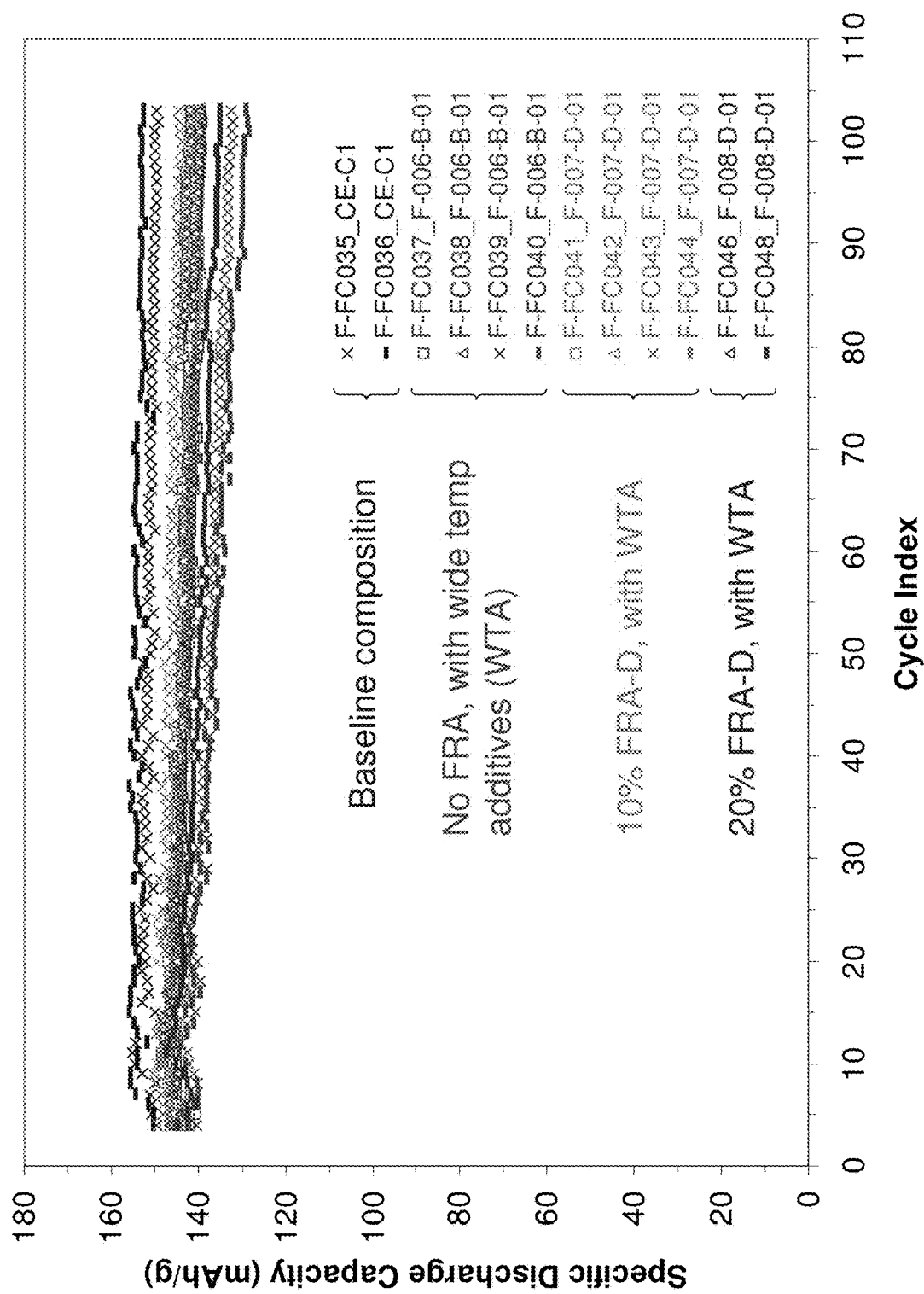
FIG. 8 is a graph showing the cycle life testing for 100 cycles (after three formation cycles for full cells with electrolytes CE-C1 (blue), F-006-B-01 (green), and F-007-D-01 (orange), and after five formation cycles for remaining cells) for full cell coin cells, wherein cells were cycled from 3.0V to 4.1V at 1.0 C rate at room temperature.

Full cells were cycled at 1 C for 100 cycles to determine the effect of electrolyte composition on cycle life. In FIG. 8, cycle life testing of cells with various electrolytes is shown. Cells underwent 3 formation cycles at C/10 (not depicted) and were then cycled at 1 C rate for 100 cycles. This test shows the WTA, ethyl propionate, may induce some attrition to cycle life of the cell, however, the FRA seems to counteract this process and diminish effects of the WTA.

Figure 9:
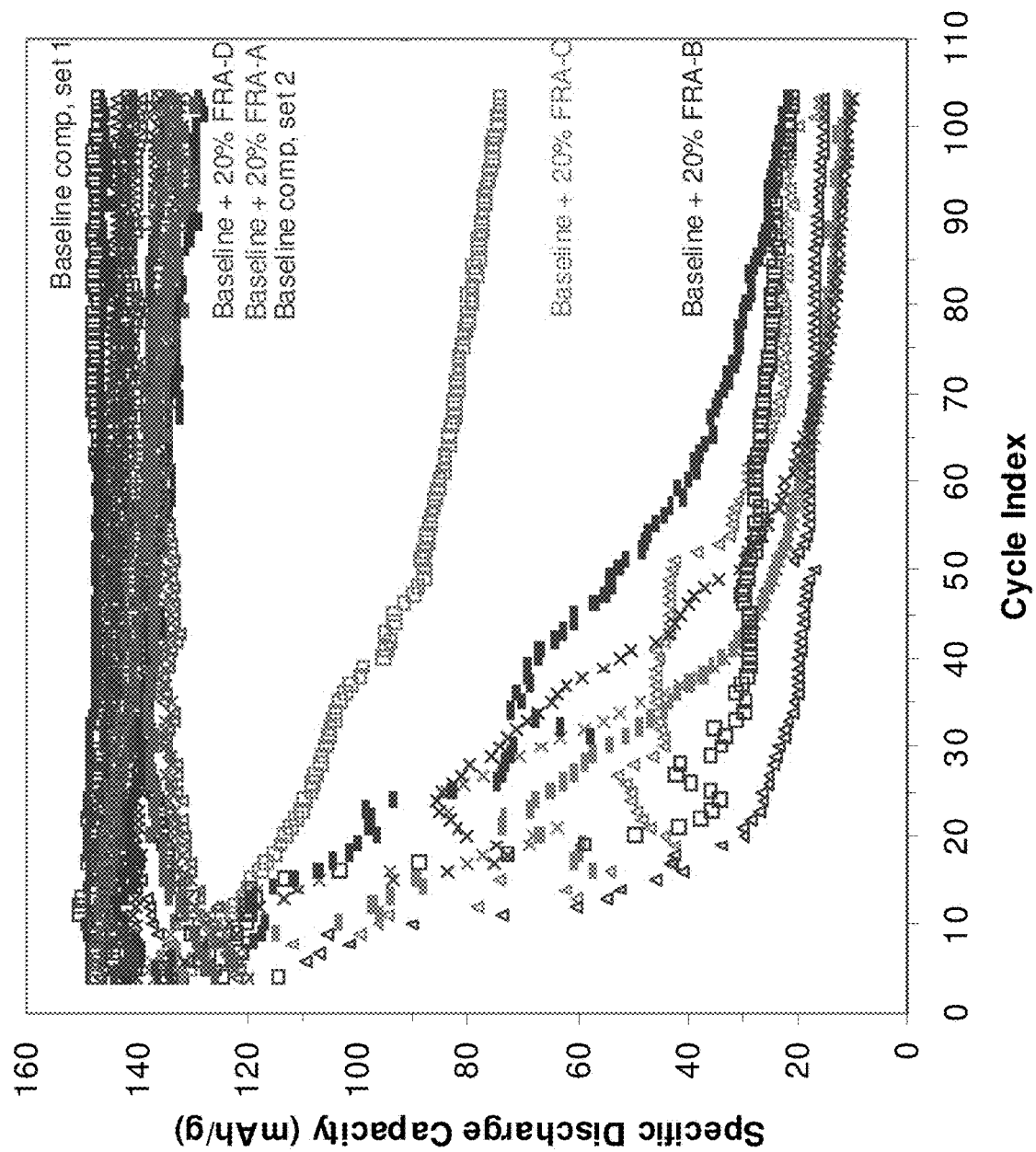
FIG. 9 is a graph showing the cycle life testing for 100 cycles (after three formation cycles at RT) for full cell coin cells using various electrolytes comparing baseline with WTA (blue & indigo), baseline with WTA and 20% cyclic phosphaze (FRA-D) (green), baseline with WTA and 20 wt % TMP (FRA-C) (orange), baseline with WTA and 20 wt % DMMP (FRA-B) (violet), and baseline with WTA and 20 wt % TTFEP (FRA-A) (red), wherein the cells were cycled from 3.0V to 4.1V at 1.0 C rate at room temperature.

To test alternative FRAs, additional cycle life testing at 1.0 C rate and room temperature conditions was performed and shown in FIG. 9. It is evident that electrolytes with TMP (FRA-C) and DMMP (FRA-B) additives show inadequate cycle life, and the electrolyte with TTFEP (FRA-A) additive does not perform as well as electrolytes with FRA-D.

Example V

The low temperature performance of cells can be improved by using specific components in the electrolyte. In Example II, the ionic conductivities of electrolytes that were flame retardant were shown to be improved at low temperatures by adding compounds such as methyl butyrate or ethyl propionate. The cell performance at low temperature also demonstrates that specific types and amounts of additives improve the low temperature performance of flame retardant electrolytes.

Figure 10:
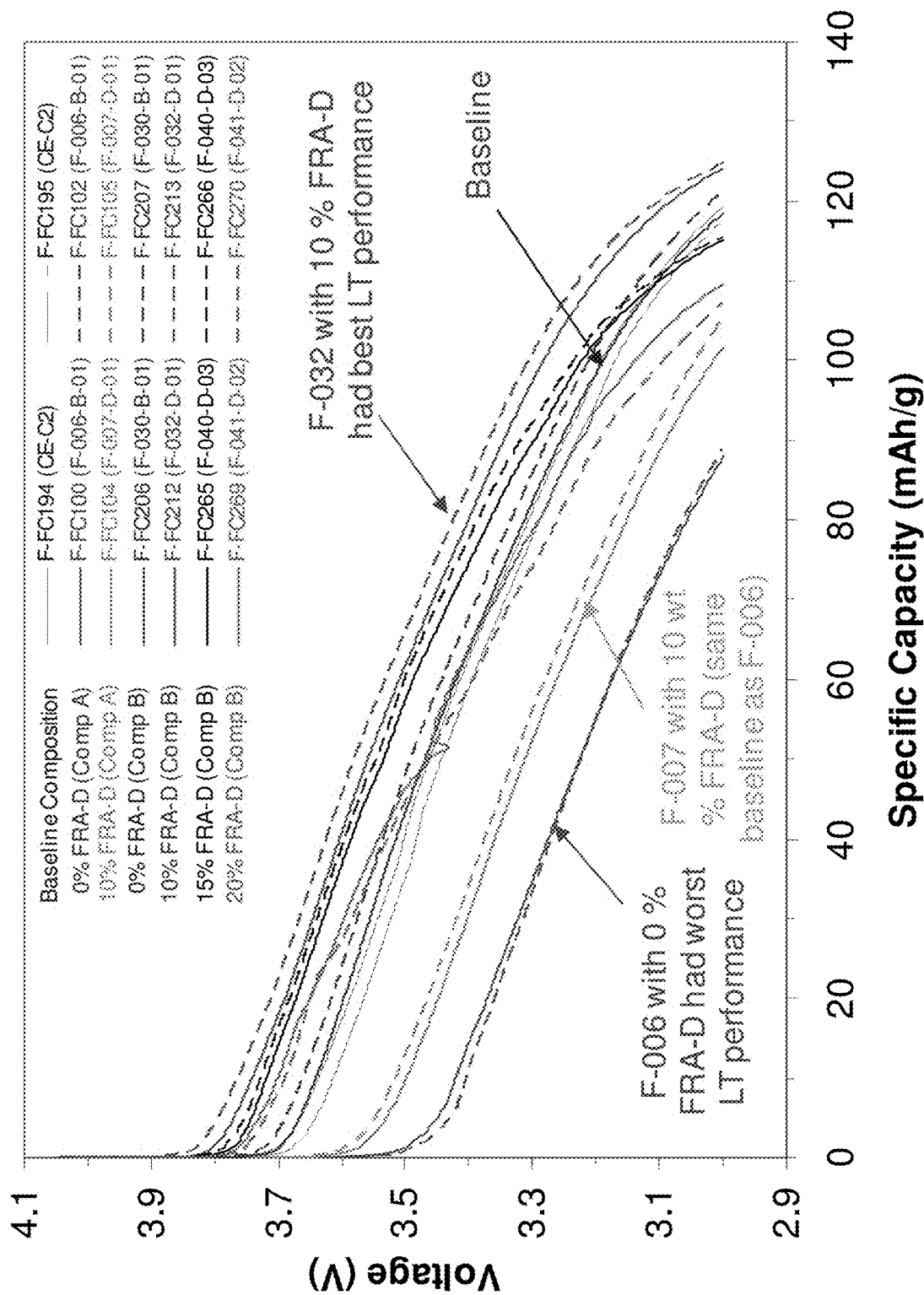
FIG. 10 is a graph showing the voltage profile of 1st discharge cycle at −40° C. (after 5 formation cycles at RT—6$^{th}$ overall discharge) for full cell coin cells comparing the commercial baseline electrolyte (blue), base composition A electrolyte with no FRA-D added (green) and with 10% FRA-D added (orange), and base composition B electrolyte with no FRA-D added (violet), with 10% FRA-D added (red), with 15% FRA-D added (black), and with 20% FRA-D added (pink), wherein the cells were cycled from 3.0V to 4.1V at C/10 rate with the charge step occurring at 25° C. and the discharge step at −40° C.

Cells containing different electrolytes and tested at −40° C. are shown in FIG. 10. Cells prepared with F-007-D-01 (with WTA, ethyl propionate, and 10 wt % FRA-D) are shown in orange, and cells prepared with F-008-D-01 (with WTA and 20 wt % FRA-D) are shown in Violet. Cells with addition of the WTAs showed both a lower operating voltage and a reduced discharge compared to cells tested using the commercial electrolyte with no WTA. However, addition of the FRA into the electrolyte showed slightly increased performance over the Lynntech baseline with only the WTAs, again indicating the combination of WTAs and FRA is better than the only WTAs.

Data shown in FIG. 10 shows that electrolytes F-032 and F-040 showed higher performance at −40° C. compared with baseline (CE-C) and the previous composition (F-007), and the electrolyte F-032 showed the best low temperature performance, and that overall performance at low temperatures is positively affected by addition of the FRA-D additive. The electrolytes F-032 and F-040 contained specific amounts (ca. 38-41%) methyl butyrate in addition to the other components. The specific combination the type and amount of lithium salt, solvents (EC, EMC and MB), flame retardant additives, and solid-electrolyte interface forming compounds provided reduced flammability and wide temperature range operation.

Electrolytes containing a low freezing point compound such as methyl butyrate, combined with the specific flame retardant additive and solid electrolyte interface-forming compound provide good low temperature performance. The performance of flame retardant compounds can be similar or better than baseline flammable components through a combination specific amounts and types of salt, solvents, low freezing point co-solvents, flame retardant additives and solid electrolyte interface-forming compounds.

The two best compositions (F-032-D and F-040-D) for low temperature performance show better performance than the baseline electrolyte and impart lower flammability. It is evident that 20% FRA-D additive shows lower performance, most likely due to a decrease in conductivity. This shows the inherent trade-off and the need to optimize the specific amount of flame retardant compound in order to obtain optimal low temperature performance.

Example VI

Specific amounts of solid electrolyte interface forming compound are needed in order to enable both low temperature performance and high temperature stability. To determine the effect of the amount of interface forming compound on the high temperature stability, full cell coin cells were evaluated at +71° C. using the lithium nickel cobalt aluminum oxide (NCA) cathode and graphite anodes, as described in Example IV.

Tests performed used a commercial electrolyte composition (CE-C) and several Lynntech electrolyte compositions (F-006-B, F-030-B, etc.) as a baselines to compare electrolytes with WTA/s and/or FRA additives. Compositions are as described in Example I. The baseline of any given set of data is represented in blue, unless noted otherwise. Full cells first undergo five formation cycles (unless noted otherwise) at a rate of C/10 and at room temperature. Then cells were cycled by charging and discharging at a rate of 1 C at +71° C.

Figure 11:
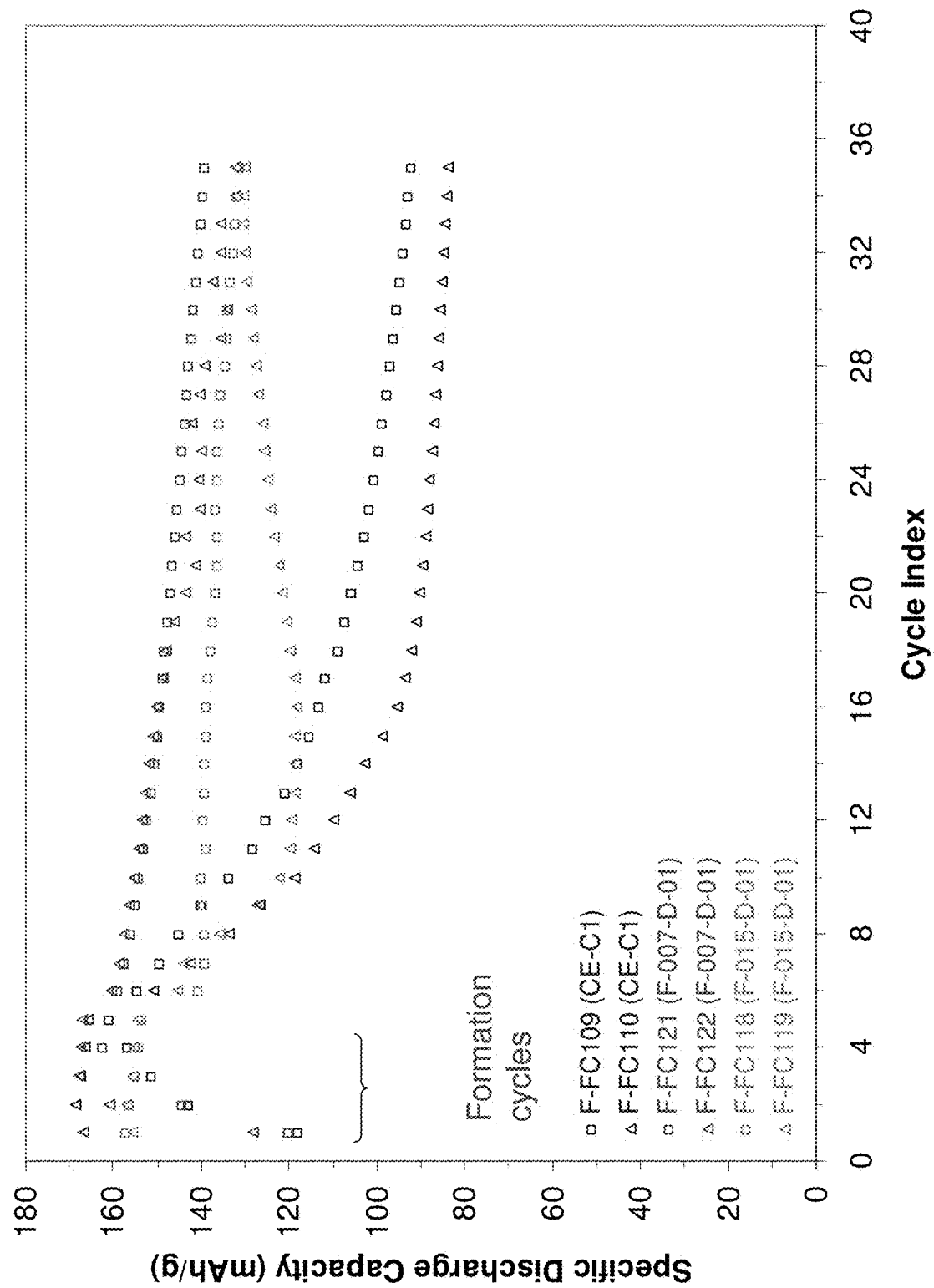
FIG. 11 is a graph showing the specific capacity of 30 discharge cycles at +71° C. (after 5 formation cycles at room temperature) for full cell coin cells with various electrolytes.

Shown in FIG. 11 are cells prepared with (1) the baseline CE-C electrolyte, (2) F-007-D-01 (with WTAs and FRA) and (3) F-015-01 which includes no primary WTA (VC), but three alternative WTAs for high temp performance and the FRA. Cells with addition of the WTAs showed improved performance over cells with the commercial baseline electrolyte. However, the electrolyte with the primary WTA out performs the electrolyte with multiple secondary WTAs for high temperature performance. While the WTAs show improved performance of the baseline, there is a loss in overall discharge capacity in all cells over 30 cycles.

Figure 12:
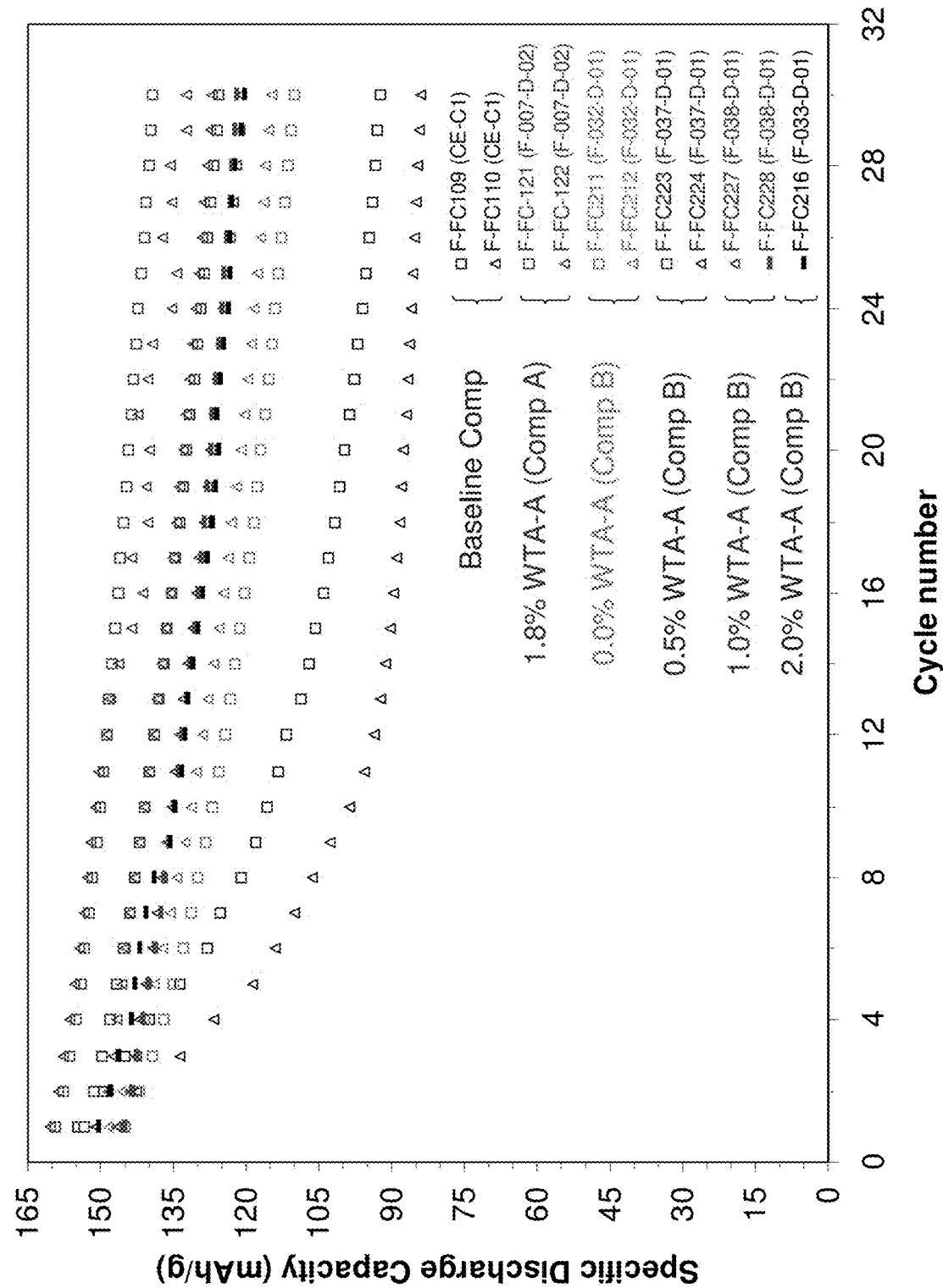
FIG. 12 is a graph showing the specific capacity of 30 discharge cycles at +71° C. (after 5 formation cycles at RT—cycles 6-35 overall for CE-C and F-007-D cells and post-low temperature cycling—cycles 9-38 overall for F-032-D, F-037-D, F-038-D, and F-033-D cells) for full cell coin cells comparing the commercial baseline electrolyte (blue), composition A electrolyte and composition B electrolytes with various amounts of WTA-A.

Based on these results, an additional evaluation was performed to determine the effect of WTA-A (VC) on high temperature performance. Electrolytes with various amounts to WTA-A were evaluated and compared against baselines, as shown in FIG. 12. Clearly all the electrolytes outperformed the baseline (CE-C; blue), but a very noticeable trend occurs showing that with increasing amount of WTA-A improves high temperature stability. The composition F-007-D showed the best high temperature performance; however, the poor low temperature performance discussed below hinders the use of this composition for wide temperature ranges. Clearly, even a small amount of WTA-A increases high temperature performance, most likely due to reactions occurring at the electrodes to provide a SEI layer that protects the cell in elevated temperature regimes; though as discussed above, that same additive, even in small amounts, greatly increases overall cell resistance and decreases cell capacity at low temperature regimes. From this evaluation, specific amounts of WTA-A in the range of about 0.5 to about 2.0 wt % can improve high temperature stability. An intermediate amount of VC in the range of about 0.5 to about 1.0 wt % also provides improved high temperature stability.

Figure 13:
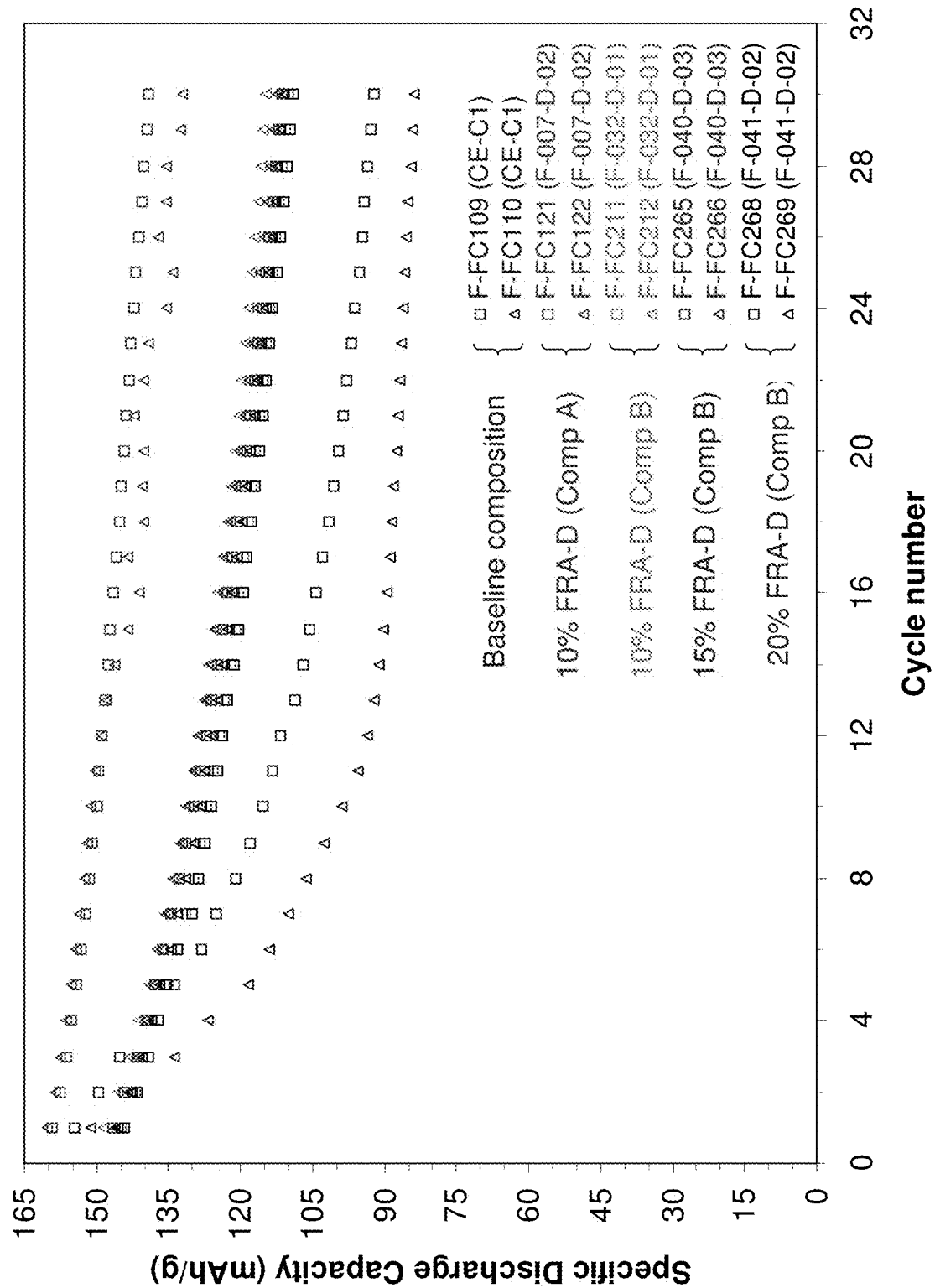
FIG. 13 is a graph showing the specific capacity of 30 discharge cycles at +71° C. (after 5 formation cycles at RT)—cycles 6-35 overall for CE-C and F-007-D cells and post-low temperature cycling—cycles 9-38 overall for F-032-D, F-040-D, and F-041 cells) for full cell coin cells with different electrolytes compared with a baseline electrolyte (blue)

In order to evaluate the effect of FRA-D on high temperature performance, electrolytes with various amounts of FRA-D additive were evaluated and are shown in FIG. 13. From this data, the percent FRA-D added to the electrolyte (up to 20 wt. %) shows no negative effect to cell performance at elevated temperatures. One possible explanation for stable performance with increasing FRA-D additive is that FRA-D may play a role in formation of a better SEI layer on the electrodes than the baseline electrolyte without FRA-D.

Figure 14:
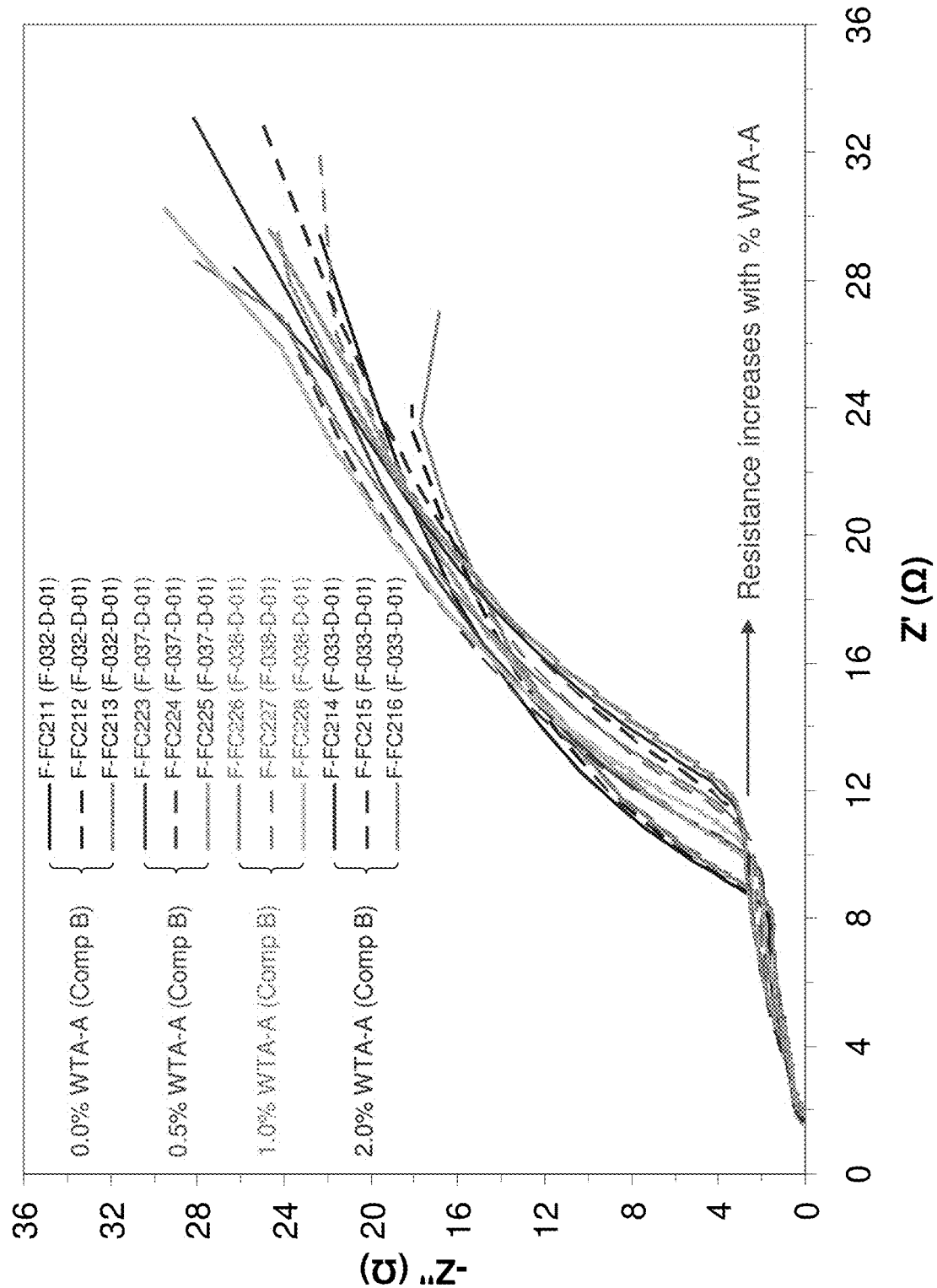
FIG. 14 is a graph showing the electrochemical impedance spectra of full cells composed comparing various cells containing different amounts of wide temperature additive (WTA-A)

The amount of the wide temperature additive, (vinylene carbonate, VC, WTA-A) was varied and its affect on the cell resistance was probed using electrochemical impedance spectroscopy (EIS) at room temperature over a frequency range of 1 MHz to 0.1 Hz. Cells were tested in a discharged state (~3.0V) after 5 formation cycles. The amount of WTA-A (VC) affected the high frequency charge transfer resistance as shown in FIG. 14. Lower VC amounts resulted in lower cell resistance, and higher amounts of VC resulted in higher resistance. This supported that an optimal amount of VC is needed to minimize resistance while also providing a protective layer to prevent electrolyte decomposition at elevated temperatures.

Figure 15:
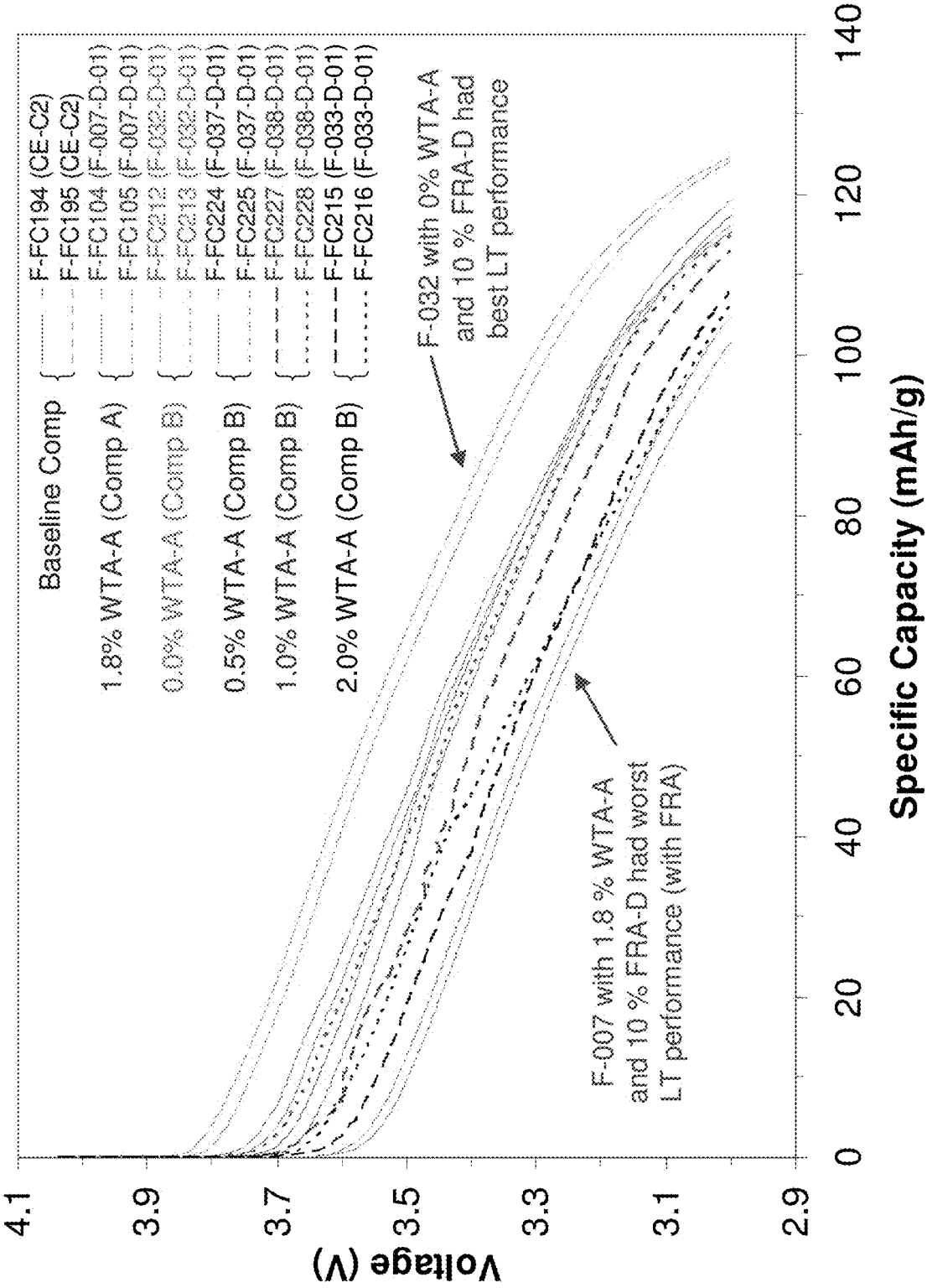
FIG. 15 is a graph showing the voltage profile of 1st discharge cycle at −40° C. (after five formation cycles at RT—6$^{th}$ overall discharge) for full cell coin cells with varying amounts of WTA at 0 wt % (orange), 0.5 wt % (violet), 1.0 wt % (red) and 2.0 wt % (black).

The effect of weight percent addition of the WTA-A (VC) on low temperature performance was determined. In FIG. 15, a clear trend is formed showing a decreasing cell voltage with increasing amount of WTA-A. The additions of WTA-A are 0 wt % (orange), 0.5 wt % (violet), 1.0 wt % (red), and 2.0 wt % (black). Additionally, these electrolytes are compared to the commercial baseline, CE-C (blue; 0 wt %), and the electrolyte, F-007-D (green; 1.8 wt %). Electrolytes F-032-D and F-037-D showed the best overall performance at −40° C. compared with the commercial baseline (CE-C) and the previous composition (F-007-D). Therefore, there exists a specific amount of WTA-A (VC) in the range of about 0.5 to about 2.0 wt % with 1.0 wt % being the most optimal to provide both good low temperature performance and high temperature stability. A sufficient amount of additive VC is needed to allow a stable interface layer that protects the electrolyte and electrodes at high temperatures from degradation, however too much VC results in a highly resistive layer that reduces low temperature performance. Other than the baseline electrolytes, all the electrolytes shown in FIG. 15 had 10 wt % FRA-D. The data supports that specific electrolyte compositions containing the proper amount and type of compounds can provide reduced flammability and similar low temperature performance as baseline flammable electrolytes.

The order of execution or performance of the methods and processes illustrated and described herein is not essential, unless otherwise specified. That is, elements of the methods and processes may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An electrolyte for an electrochemical storage device, the electrolyte comprising:
 a lithium salt from about 3% to about 20% by weight;
 a primary solvent from about 15% to about 25% by weight;
 wide-temperature co-solvents from about 14% to about 55% by weight;
 interface forming compounds from about 0.5% to about 2.0% by weight; wherein the interface forming compound is selected from the group consisting of vinylene carbonate, vinyl ethylene carbonate, lithium bis(oxalato)borate, and combinations thereof; and
 a flame retardant compound from about 6% to about 60% by weight,
 wherein the electrolyte interacts with at least one positive electrode configured to store and release lithium-ions and at least one negative electrode configured to store and release lithium-ions, the at least one positive electrode and the at least one negative electrode forming portions of the electrochemical storage device.

2. The electrolyte as recited in claim 1, wherein the electrochemical storage device further comprises a device selected from the group consisting of batteries, lithium-ion batteries, and supercapacitors.

3. The electrolyte as recited in claim 1, wherein the electrochemical storage device further comprises a lithium-ion battery.

4. The electrolyte as recited in claim 1 wherein the lithium salt further comprises a salt selected from the group consisting of lithium hexafluorophosphate, lithium bistrifluoromethanesulfonimide (LiTFSI), lithium tetrafluoroborate (LiBF4), and combinations thereof.

5. The electrolyte as recited in claim 1, wherein the lithium salt further comprises lithium hexafluorophosphate.

6. The electrolyte as recited in claim 1, wherein the primary solvent further comprises a solvent selected from the group of solvents consisting of ethylene carbonate, diethyl carbonate, dimethyl carbonate, ethyl methyl carbonate, ethyl propionate, methyl butyrate, ethyl acetate, ethyl butyrate and/or 1,3-dioxolane, and mixtures thereof.

7. The electrolyte as recited in claim 1, wherein the primary solvent further comprises ethylene carbonate.

8. The electrolyte as recited in claim 1, wherein the wide-temperature co-solvent further comprises a solvent selected from the group consisting of ethylene carbonate, diethyl carbonate, dimethyl carbonate, ethyl methyl carbonate, ethyl propionate, methyl butyrate, ethyl acetate, ethyl butyrate and/or 1,3-dioxolane, and mixtures thereof.

9. The electrolyte as recited in claim 1, wherein the wide-temperature co-solvents further comprises ethyl methyl carbonate.

10. The electrolyte as recited in claim 1, wherein the wide-temperature co-solvent further comprises methyl butyrate.

11. The electrolyte as recited in claim 1, wherein the wide temperature co-solvent further comprises a mixture of ethyl methyl carbonate and methyl butyrate.

12. The electrolyte as recited in claim 1, wherein the interface forming compound is vinylene carbonate.

13. The electrolyte as recited in claim 1, wherein the flame retardant compound further comprises a compound selected from the group consisting of cyclic phosphonates, phosphonates, phosphates, ionic liquids, and combinations thereof.

14. The electrolyte as recited in claim 1, wherein the flame retardant compound further comprises 2-ethoxy-2,4,4,6,6-pentafluoro-1,3,5,$2\lambda^5$, $4\lambda^5$, $6\lambda^5$ triazatriphosphinine.

* * * * *